US006221420B1

(12) United States Patent
Thomas et al.

(10) Patent No.: US 6,221,420 B1
(45) Date of Patent: Apr. 24, 2001

(54) FOODS CONTAINING THERMALLY-INHIBITED STARCHES AND FLOURS

(75) Inventors: David J. Thomas, Woodbury, MN (US); Chung-Wai Chiu, Westfield, NJ (US); Eleanor Schiermeyer, Bound Brook, NJ (US); Manish B. Shah, Franklin Park, NJ (US); Douglas H. Hanchett, Wharton, NJ (US); Roger Jeffcoat, Bridgewater, NJ (US)

(73) Assignee: National Starch and Chemical Investment Holding Corporation, Wilmington, DE (US)

( * ) Notice: Subject to any disclaimer, the term of this patent is extended or adjusted under 35 U.S.C. 154(b) by 0 days.

(21) Appl. No.: 08/619,569

(22) PCT Filed: Jul. 28, 1995

(86) PCT No.: PCT/US95/09138

§ 371 Date: May 29, 1996

§ 102(e) Date: May 29, 1996

(87) PCT Pub. No.: WO96/03892

PCT Pub. Date: Feb. 15, 1996

Related U.S. Application Data

(63) Continuation-in-part of application No. PCT/US95/00684, filed on Jan. 18, 1995, and a continuation-in-part of application No. 08/473,688, filed on Jun. 7, 1995, now abandoned, and a continuation-in-part of application No. 08/476,963, filed on Jun. 7, 1995, now Pat. No. 5,720,822, said application No. PCT/US95/00684, is a continuation-in-part of application No. PCT/US94/08559, filed on Jul. 29, 1994, and a continuation-in-part of application No. 08/296,211, filed on Aug. 25, 1994, now abandoned, said application No. PCT/US94/08559, is a continuation-in-part of application No. 08/099,753, filed on Jul. 30, 1993, now abandoned, said application No. 08/296,211, is a continuation-in-part of application No. 08/099,753.

(51) Int. Cl.[7] .................................................. A23L 1/05

(52) U.S. Cl. .......................... 426/578; 426/573; 426/658; 426/661

(58) Field of Search .................................. 426/658, 661, 426/573, 578, 579, 549

(56) References Cited

U.S. PATENT DOCUMENTS

| | | | |
|---|---|---|---|
| 2,274,789 | 3/1942 | Horesi | 127/38 |
| 2,317,752 | 4/1943 | Fuller | 127/33 |
| 2,373,016 | 4/1945 | Daly et al. | 127/70 |
| 2,427,328 | 9/1947 | Schopmeyer et al. | 127/32 |
| 2,590,912 | 4/1952 | Yarber | 127/32 |

(List continued on next page.)

FOREIGN PATENT DOCUMENTS

| | | |
|---|---|---|
| 1 150 934 | 8/1982 | (CA) . |
| 0 129 227 A1 | 12/1984 | (EP) . |
| 0 257 338 A2 | 2/1988 | (EP) . |
| 0 321 216 A2 | 6/1989 | (EP) . |
| 0 415 385 A2 | 3/1991 | (EP) . |
| 0 490 424 A1 | 6/1992 | (EP) . |
| 263897 | 12/1926 | (GB) . |
| 530226 | 12/1940 | (GB) . |
| 595552 | 12/1947 | (GB) . |
| 1224281 | 10/1971 | (GB) . |
| 1479515 | 7/1977 | (GB) . |
| 60-97331 | 5/1985 | (JP) . |
| 61-254602 | 11/1986 | (JP) . |
| 63-194725 | 8/1988 | (JP) . |
| WO 95/04082 | 2/1995 | (WO) . |

OTHER PUBLICATIONS

Whistler et al. ed, Starch: Chemistry and Technology, Second Edition, Academic Press, Orlando, 1984, pp. 232–245.*

Smelik et al. "Process for Manufacture of Starch with Reduced Gluten Content", C.A. Abstract 108, No. 20 169546S (1988).

P.H. List et al., "Hagers Handbuch der Pharmazeutischen Praxis", 1977.

"Handbook of Pharmaceutical Excipients", 1986.

Ullmanns Encyclopädie der technischen Chemie, vol. 22, 1982.

Irving Martin, *Journal of Applied Polymer Science*, "Crosslinking of Starch by Alkaline Roasting", vol. 11, No. 5, pp. 1283–1288 (May 1967).

J.W. Donovan et al., *Cereal Chemistry*, "Differential Scannign Calorimetry of Heat–Moisture Treated Wheat and Potato Starches", vol. 60, No. 5, pp. 381–387 (1983).

Rolf Stute, *Starch/Stärke*, "Hydrothermal Modification of Starches" The Difference Between Annealing and Heat/Moisture Treatment, vol. 44, No. 6, pp. 205–214 (1992).

L. Sair et al., *Industrial and Engineering Chemistry*, "Water Sorption by Starches", vol. 36. No. 3, pp. 18–21.

Dong–Hyun Lee et al., *Chem. Eng. Technol.*, "Drying Characteristics of Starch in an Inert Medium Fluidized Bed", vol. 16, pp. 263–269 (1993).

"The bepex Fluid Bed" (Bulletin).

Cristina Ferrero et al., *Journal of Food Processing and Preservation*, "Stability of Frozen Starch Pastes: Effect of Freezing, Storage and Xanthan Gum Addition", vol. 17, pp. 191–211 (1993).

*Primary Examiner*—Leslie Wong
(74) *Attorney, Agent, or Firm*—Margaret B. Kelley; Ellen T. Dec

(57) ABSTRACT

A thermally-inhibited granular starch or flour is used as an ingredient in various foods. The thermally-inhibited starches are functionally equivalent to chemically cross-linked starches. The stashes or flours are prepared by dehydrating the starch or flour to anhydrous or substantially anhydrous (<1% moisture), preferably at a neutral or basic pH, and heat treating the dehydrated starch or flour for a time sufficient to inhibit the starch to the desired degree. The dehydration may be carried out by heating the starch, extracting the starch with a solvent, or freeze drying the starch. The starch may be pregelatinized prior to or after thermal inhibition using known methods which do not substantially rupture the starch granules.

26 Claims, 2 Drawing Sheets

U.S. PATENT DOCUMENTS

| | | | |
|---|---|---|---|
| 2,661,349 | 12/1953 | Caldwell et al. | 260/224 |
| 2,791,512 | 5/1957 | Hatch et al. | 106/208 |
| 2,897,086 | 7/1959 | Sowell et al. | 99/139 |
| 2,951,776 | 9/1960 | Scallet et al. | 127/71 |
| 3,155,527 | 11/1964 | Mentzer | 106/210 |
| 3,331,697 | 7/1967 | Salamon | 106/213 |
| 3,399,081 | 8/1968 | Bernetti et al. | 127/71 |
| 3,408,214 | 10/1968 | Mentzer | 106/212 |
| 3,463,668 | 8/1969 | Evans et al. | 127/32 |
| 3,477,903 | 11/1969 | Semegran et al. | 161/266 |
| 3,490,917 | 1/1970 | Doe et al. | 99/93 |
| 3,515,591 | 6/1970 | Feldman et al. | 127/32 |
| 3,563,798 | 2/1971 | Germino et al. | 127/32 |
| 3,578,497 | 5/1971 | Hjermstad | 127/32 |
| 3,607,394 | 9/1971 | Germino et al. | 127/32 |
| 3,607,396 | 9/1971 | Germino et al. | 127/71 |
| 3,640,756 | 2/1972 | Beersma et al. | 117/76 |
| 3,690,938 | 9/1972 | Swift | 117/122 |
| 3,725,387 | 4/1973 | McClendon et al. | 260/233.3 |
| 3,810,783 | 5/1974 | Bomball | 117/122 |
| 3,844,807 | 10/1974 | Bramel | 106/213 |
| 3,949,104 | 4/1976 | Cheng et al. | 426/578 |
| 3,950,593 | 4/1976 | Bomball | 428/476 |
| 3,967,975 | 7/1976 | Idaszak | 127/23 |
| 3,977,897 | 8/1976 | Wurzburg et al. | 127/71 |
| 4,013,799 | 3/1977 | Smalligan et al. | 426/578 |
| 4,131,574 | 12/1978 | Isherwood et al. | 260/17.3 |
| 4,256,509 | 3/1981 | Tuschhoff et al. | 127/32 |
| 4,266,348 | 5/1981 | Ledding | 34/10 |
| 4,280,851 | 7/1981 | Pitchon et al. | 127/33 |
| 4,303,451 | 12/1981 | Seidel et al. | 127/32 |
| 4,303,452 | 12/1981 | Ohira et al. | 127/32 |
| 4,329,181 | 5/1982 | Chiu et al. | 106/213 |
| 4,366,275 | 12/1982 | Silano et al. | 524/47 |
| 4,391,836 | 7/1983 | Chiu | 426/578 |
| 4,428,972 | 1/1984 | Wurzburg et al. | 426/578 |
| 4,465,702 | 8/1984 | Eastman et al. | 426/578 |
| 4,491,483 | 1/1985 | Dudacek et al. | 127/33 |
| 4,575,395 | 3/1986 | Rudin | 127/32 |
| 4,600,472 | 7/1986 | Pitchon et al. | 159/4 B |
| 4,610,760 | 9/1986 | Kirkpatrick et al. | 159/4.01 |
| 4,847,371 | 7/1989 | Schara et al. | 536/111 |
| 5,037,929 | 8/1991 | Rajagopalan et al. | 426/578 |
| 5,085,228 | 2/1992 | Mooney et al. | 131/37 |
| 5,087,649 | 2/1992 | Wegner et al. | 524/30 |
| 5,149,799 | 9/1992 | Rubens | 536/102 |
| 5,155,140 | 10/1992 | Marten et al. | 523/100 |
| 5,181,959 | 1/1993 | Nagai et al. | 106/211 |
| 5,329,004 | 7/1994 | Eden et al. | 536/109 |
| 5,368,690 | 11/1994 | Solarek et al. | 162/175 |

\* cited by examiner

FOODS CONTAINING THERMALLY-INHIBITED STARCHES AND FLOURS

This application is a §371 U.S. national phase application based on PCT/US95/09138 filed Jul. 28, 1995. The PCT 138 application is a continuation-in-part of (i) PCT/US95/00684 filed Jan. 18, 1995, (ii) of U.S. Ser. No. 08/473,688 filed Jun. 7, 1995, now abandoned; and (iii) of U.S. Ser. No. 08/476,963 filed Jun. 7, 1995, which issued Feb. 24, 1998 as U.S. Pat. No. 5,720,822. The PCT '684 application is a continuation-in-part of (i) PCT/US94/08559 filed Jul. 29, 1994, and (ii) U.S. Ser. No 08/296,211 filed Aug. 25, 1994, now abandoned. The PCT '559 application and the U.S. '211 application are continuation-in-part applications of U.S. Ser. No. 08/099,753 filed Jul. 30, 1993, now abandoned.

FIELD OF THE INVENTION

This invention relates to foods containing thermally-inhibited starches and flours which are functionally equivalent to chemically inhibited (i.e., chemically crosslinked) starches.

BACKGROUND OF THE INVENTION

Heat/moisture treatment and annealing of starches are taught in the literature.

For example, see the article "Differential Scanning Calorimetry of Heat-Moisture Treated Wheat and Potato Starches" by J. W. Donovan et al. in Cereal Chemistry, Vol. 60, No. 5, pp. 381–387 (1983). See also the article "A DSC Study Of The Effect Annealing On Gelatinization Behavior of Corn Starch" by B. R. Krueger et al. in Journal of Food Science, Vol. 52, No. 3, pp. 715–718 (1987). In both cases, it is observed that the gelatinization temperature of the starches are increased as a result of the heat/moisture treatment or annealing.

The article "Hydrothermal Modification of Starches: The Difference between Annealing and Heat/Moisture-Treatment", by Rolf Stute, Starch/Stärke 44, No. 6, pp. 205–214 (1992) defines "annealing" as slurrying the starch with excess water at temperatures below the starch'vs gelatinization temperature and "heat/moisture-treatment" as a semi-dry treatment (i.e., no added moisture with the only moisture being that normally present in the starch granule which is typically 10% or more) at temperatures below the starch's gelatinization temperature. Almost identical modifications in the properties of potato starch were obtained with both treatments even through the alteration of the granular structure was different. The Brabender curves of the heat/moisture-treated and annealed potato starches showed the same typical changes, including a higher gelatinization temperature and a lower peak viscosity or no peak. The DSC curves also showed a shift to higher gelatinization temperatures for both treatments. A combined treatment of annealing a heat/moisture-treated potato starch led to a further increase in gelatinization temperature without detectable changes in gelatinization enthalpy and with the viscosity changes caused by the heat treatment remaining. The heat/moisture-treatment of an annealed potato starch does not lower the gelatinization temperature when compared to the base and increases the gelatinization temperature at higher heat/moisture treatment levels.

The article "Heat-Moisture Treatment of Starches", by Louis Sair, *Ind. Eng. Chem.*, 36, 205 (1944) pages 283–285 discloses starch modification by heating in a pressure cooker at 100% relative humidity. The starch was exposed to steam at 90 to 100° C. for 2 to 18 hours or heated at 27% moisture at 92 to 100° C. for up to 16 hours. The heat/moisture treatment caused rearrangement of and a higher degree of association of the starch chains. There was a change in the X-ray pattern of potato starch from a B form to an A form of the starch molecule.

U.S. Pat. No. 3,977,897 (issued Aug. 31, 1976 to Wurzburg et al.) discloses a method for preparing non-chemically inhibited amylose-containing starches. Both cereal and root starches can be inhibited, but the inhibition effects are more observable with root starches. Amylose-free starches, such as waxy corn starch, showed no or very slight inhibition. The Brabender viscosity of cooked pastes derived from the treated starch was used to determine the inhibition level. Inhibition was indicated by a delayed peak time in the case of the treated corn starch, by the lack of a peak and a higher final viscosity in the case of the treated achira starch, and by the loss of cohesiveness in the case of the treated tapioca starch. The granular starch is suspended in water in the presence of salts which raise the starch's gelatinization temperature so that the suspension may be heated to high temperatures without causing the starch granules to swell and rupture yielding a gelatinized product. The preferred salts are sodium ammonium, maynesiu or potassium sulfate, sodium, potassium or ammonium chloride, and sodium, potassium or ammonium phosphate. About 10–60 parts of salt are used per 100 parts by weight of starch. Preferably about 110 to 220 parts of water are used per 100 parts by weight of starch. The suspension is heated at 50 to 100° C., preferably 60 to 90° C., for about 0.5 to 30 hours. The pH of the suspension was maintained at about 3.0 to 9.0, preferably 4–7. Highly alkaline systems, i.e., pH levels above 9 retard inhibition.

U.S. Pat. No. 4,013,799 (issued Mar. 22, 1977, to Smalligan et al.) discloses heating a tapioca starch above its gelatinization temperature with insufficient moisture (15 to 35% by total weight) to produce gelatinization. The starch is heated to 70 to 130° C. for 1 to 72 hours. The starch is used as a thickener in wet, pre-cooked baby foods having a pH below about 4.5.

U.S. Pat. No. 4,.303,451 (issued Dec. 1, 1981 to Seidel et al.) discloses a method for preparing a pregelatinized waxy maize starch having improved flavor characteristics reminiscent of a tapioca starch. The starch is heat treated at 120 to 200° C. for 15 to 20 minutes. The pregelatinized starch has gel strength and viscosity characteristics suitable for use in pudding mixes.

U.S. Pat. No. 4,302,452 (issued Dec. 1, 1981 to Ohira et al.) discloses smoking a waxy maize starch to improve gel strength and impart a smoky taste. In order to counteract the smoke's acidity and to obtain a final product with a pH of 4 to 7, the pH of the starch is raised to pH 9 to 11 before smoking. The preferred water content of the starch during smoking is 10–20%

GB-A-595,552 discloses treatment of starch, more particularly a corn starch, which involves drying the starch to a relatively low moisture content of 1–2%, not exceeding 3% and subsequently dry heating the substantially moisture-free starch at 115–126° C. for 1 to 3 hours. The treatment is intended to render the starch free from thermophilic bacteria and the starch should not be heated longer than necessary to effect the desired sterilization.

Japanese Patent Publication No. 61-254602, (published Dec. 11, 1987) discloses a wet and dry method for heating waxy corn starch and derivatives thereof to impart emulsification properties. The wet or dry starch is heated at 100 to 200° C., preferably 130 to 150° C., for 0.5 to 6 hours. In the dry method, the water content is 10%, preferably 5%, or less. In the wet method, the water content is 5 to 50%, preferably 20–30. The pH is 3.5 to 8, preferably pH 4.0 to 5.0.

The processed food industry has sought to satisfy consumer demands for foods containing starches which have not been chemically modified but which have the same functional properties as chemically modified starches.

Starches are chemically modified with difunctional reagents, such as phosphorus oxychloride, sodium trimetaphosphate, adipic anhydride, acetic anhydride and epichlorohydrin, to produce chemically crosslinked starches having excellent tolerance to processing variables such as heat, shear, and pH extremes. Such chemically crosslinked starches provide a desirable smooth texture and possess viscosity stability throughout the processing operation and normal shelf life of the food.

In contrast, unmodified (i.e., non-crosslinked) starches breakdown in viscosity, loose thickening capacity and textural qualities, and behave unpredictably during storage as a result of the stresses encountered during food processing. Heat, shear, and/or an extreme pH, especially an acidic pH, tend to fully disrupt the starch granules and disperse the starch into the food. Hence, unmodified starches are generally unsuitable for use in processed foods.

SUMMARY OF THE INVENTION

The present invention provides a food which contains a thermally-inhibited starch or flour which is a granular non-pregelatinized starch or flour or a granular pregelatinized starch or flour. When the starch is pregelatinized prior to thermal inhibition, the starch is referred to as a "pregelatinized thermally-inhibited granular starch". When the starch is pregelatinized subsequent to thermal inhibition, the starch is referred to as a "thermally-inhibited pregelatinized granular starch."

The thermally-inhibited starches can be pregelatinized prior to or after the thermal inhibition process using methods known in the art which will not destroy the granular structure. The resulting pregelatinized starches are useful in food applications where cold-water-soluble or instant gelling starches are used.

The moderately inhibited granular non-pregelatinized starches and flours have a reduced gelatinization temperature and a lowered ethalapy. It is believed the overall granular structure of the thermally inhibited starches has been altered. In contrast, chemically crosslinked starches are substantially unchanged in gelatinization temperature and enthalapy.

The starches and flours that are substantially completely inhibited will resist gelatinization; the starches and flours that are highly inhibited will gelatinize to a limited extent and show a continuing rise in viscosity, but will not attain a peak viscosity; the starches and flours that are moderately inhibited will exhibit a lower peak viscosity, and a lower percentage breakdown in viscosity compared to the same starch that is not inhibited; and the starches and flours that are lightly inhibited will show a slight increase in peak viscosity and a lower percentage breakdown in viscosity compared to the same starch that is not inhibited.

The starches or flours are thermally inhibited in a process that results in the starch or flour becoming and remaining inhibited, hereinafter referred to as "inhibited" or "thermally-inhibited", without the addition of chemical reagents. When these thermally-inhibited starches or flours are dispersed and/or cooked in water, they exhibit the properties characteristic of a chemically crosslinked (i.e., inhibited) starch.

The amount of thermal inhibition required will depend on the reason the starch was included in the food, e.g., thickening, gelling, extending, and the like, as well as the particular processing conditions used to prepare the foods. Foods prepared with thermally-inhibited starches or flours possess both process tolerance, such as resistance to heat, acid, and shear, as well as improved texture and viscosity stability. These thermally-inhibited starches and flours have the functional characteristics of a chemically crosslinked starch but differ in that their gelatinization temperature is lowered when the starches or flours are moderately highly inhibited.

Initially, it should be noted that when certain native starches, particularly waxy-based starches, are gelatinized, they reach a peak viscosity, which soon begins to breakdown as the starch polymers disassociate and become solubilized and the granular integrity is lost, thereby causing the starch paste to become cohesive or runny. In contrast, when the thermally-inhibited starches are dispersed and/or cooked in an aqueous medium, the starch granules are more resistant to viscosity breakdown than starches which are not thermally-inhibited. This resistance to breakdown results in what is subjectively considered a non-cohesive, or "short" textured paste, meaning that the gelatinized starch tends to be salve-like and heavy in viscosity rather than runny or gummy.

Depending on the extent of the heat treatment, various levels of inhibition can be achieved. For example, higher viscosity products with little breakdown as well as highly inhibited, low viscosity products with no breakdown can be prepared by the thermal inhibition process described herein.

The present invention also provides a method for preparing a food which is to be thickened or gelled, with or without heating, which comprises the step of adding to one or more of the food ingredients, prior to or during the processing of the food ingredients, the thermally-inhibited non-pregelatinized starch or flour or thermally-inhibited pregelatinized granular starch or flour. It also provides a method for extending a food which comprises the step of replacing or partially replacing one or more of the ingredients typically used in the food (e.g., fat, fruit solids, and the like) with a thermally-inhibited starch or flour. One skilled in the art will recognize that a mixture of thermally-inhibited starches, including granular non-pregelatinized and granular pregelatinized starches or flours can be used.

Foods containing the thermally-inhibited non-pregelatinized or thermally-inhibited pregelatinized starches or flours are functionally equivalent to foods containing chemically crosslinked starches. This permits the food manufacturer to avoid label declarations associated with the chemical crosslinking of starch, and, thereby, provide a perceived consumer benefit.

Foods containing certain chemically modified starches which are subsequently thermally-inhibited show advantageous properties for use as "heat penetration" starches and "fill viscosity" starches.

DESCRIPTION OF THE PREFERRED EMBODIMENTS

Figure 1:
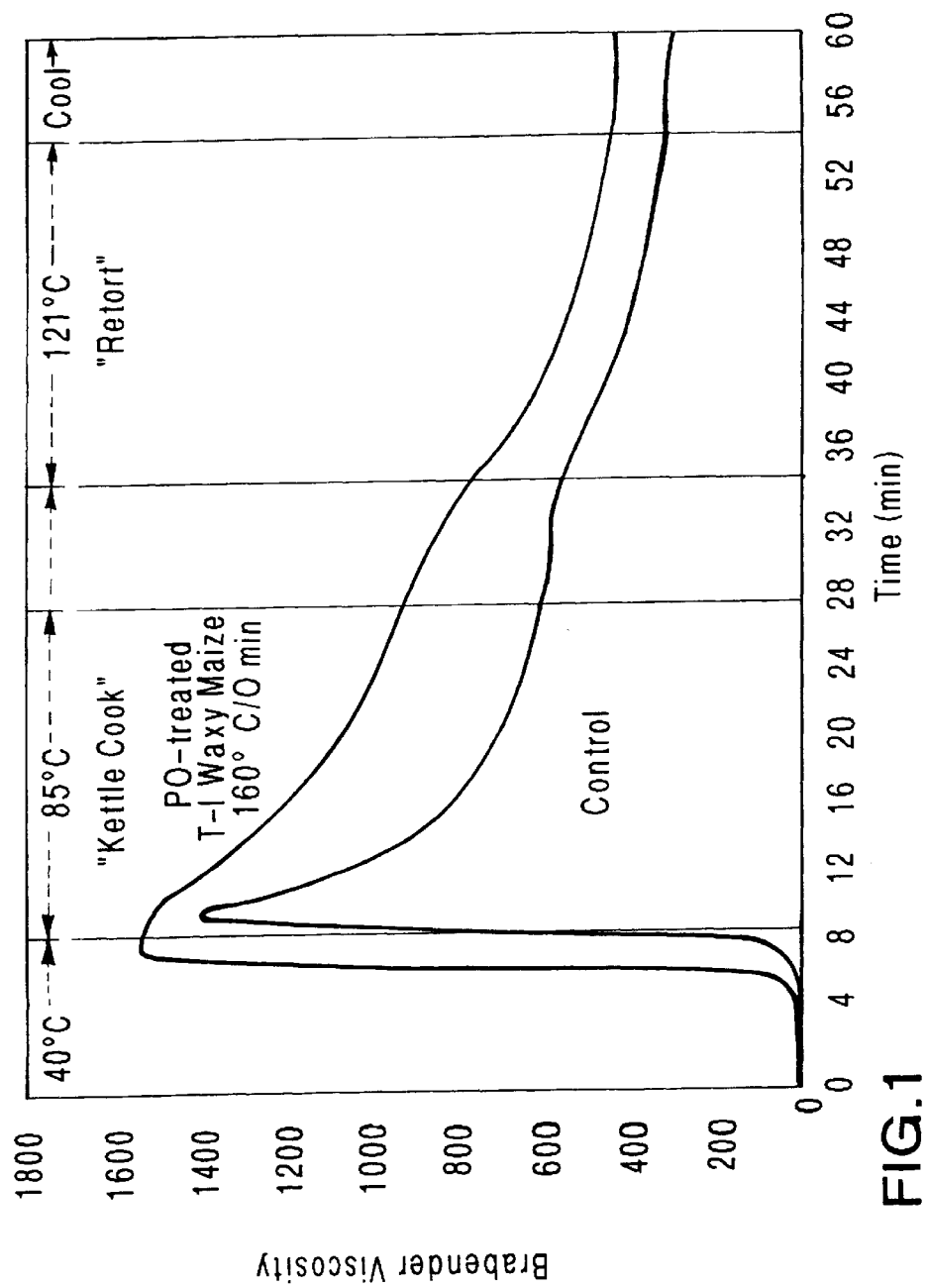
FIG. 1 is a viscosity profile of thermally-inhibited 7.0% PO waxy maize at neutral pH and 5% solids.

A "thermally-inhibited starch or flour" means a granular non-pregelatinized starch or flour which is dehydrated to anhydrous or substantially anhydrous and heat-treated with sufficient dry heat at an appropriate pH, preferably neutral to basic, to provide the starch with functional characteristics similar to those of a chemically crosslinked starch.

As used herein, a "thermally-inhibited pregelatinized starch or flour" means a granular pregelatinized starch or flour which is dehydrated to anhydrous or substantially anhydrous and heat-treated with sufficient dry heat at an appropriate pH, preferably neutral to basic, and pregelatinized prior to or subsequent to the dehydration and heat treatment, using a pregelatinization process which maintains the granular integrity, to provide the starch with functional characteristics similar to those of a chemically crosslinked pregelatinized granular starch.

One skilled in the art will recognize that generally the "starches" used in a food can be replaced by their corresponding "flours". Unless specifically distinguished, references to starch in this description are meant to include their corresponding flours. References to starch are also meant to include starch to which protein has been added, whether the protein is endogenous protein, or added protein from an animal or plant source, such as, zein, albumin, and soy protein. This is inconsistent with protein removal.

The starches and flours may be derived from any native source such as cereals, tubers, roots, fruits and legumes. A native starch is one as it is found in nature in unmodified form. Typical native starch sources are corn (maize), pea, potato, sweet potato, barley, wheat, rice, sago, amaranth, tapioca, banana, sorghum, waxy maize, waxy rice, waxy barley, waxy potato, starches containing greater than 40% amylose (also referred to as high amylose starches), and the like. The preferred starches for many food uses are the waxy starches, including waxy maize, waxy rice, waxy barley, waxy potato, and a low temperature stable waxy maize hybrid ("V.O. hybrid"). The "V.O. hybrid" is described in U.S. Pat. No. 4,428,972 (issued Jan. 31, 1984 to Wurzburg et al.). Also preferred when a thermally-inhibited gelling starch is required are tapioca, potato, corn, wheat and starches containing greater than 40% amylose.

The first step of the thermal inhibition process is dehydrating the starch or flour until it is anhydrous or substantially anhydrous. The second step is heat treating the dehydrated (i.e. anhydrous or substantially anhydrous starch or flour) for a time and at a temperature sufficient to inhibit the starch or flour and preferably render it non-cohesive. As used herein, substantially anhydrous means containing less than 1% moisture by weight.

Native granular starches have a natural pH of about 5.0 to 6.5. When such starches are heated to temperatures above about 125° C. in the presence of water, acid hydrolysis, i.e., degradation, of the starch occurs. This degradation impedes or prevents inhibition. Therefore, the dehydration conditions need to be chosen so that degradation is avoided. Suitable conditions are dehydrating at low temperatures and the starch's natural pH or dehydrating at higher temperatures after increasing the pH of the starch to neutral or above. As used herein, neutral covers the range of pH values around pH 7 and is meant to include from about pH 6.5 to about pH 7.5. The preferred pH ranges are a pH of at least 7.0, preferably pH 7.5 to pH 10.5. The most preferred pH ranges are above pH 8 to below pH 10. At a pH above 12, gelatinization more easily occurs. Therefore, pH adjustments below 12 are more effective. It should be noted that the textural and viscosity benefits of the thermal inhibition process tend to be enhanced as the pH is increased, although higher pHs tend to increase browning of the starch during the heat treating step.

To adjust the pH, the granular starch is typically slurried in water or another aqueous medium, in a ratio of 1.5 to 2.0 parts of water to 1.0 part of starch, and the pH is raised by the addition of any suitable base, such as those described below. Buffers, such as sodium phosphate, may be used to maintain the pH if needed. Alternatively, a solution of a base may be sprayed onto the powdered starch until the starch attains the desired pH, or an alkaline gas, such as ammonia, can be infused into the starch.

After the pH adjustment, the slurry of the granular starches which are not going to be pregelatinized is then either dewatered and dried, or dried directly, preferably to a 2 to 6% moisture content. These drying procedures are to be distinguished from the thermal inhibition process steps in which the starch is dehydrated to anhydrous or substantially anhydrous and then heat treated.

If the pregelatinization process is performed prior to the thermal inhibition process, a granular starch or flour is slurried in water in a ratio of 1.5 to 2.0 parts to 1.0 part starch, and preferably, the pH is adjusted to neutral or greater by the addition of a base. As used herein, "neutral" covers the range of pH values around pH 7 and is meant to include from about pH 6.5 to about pH 7.5 In a preferred embodiment, the slurry is simultaneously pregelatinized and dried and the dried starch or flour is then dehydrated and thermally-inhibited.

If the thermal inhibition process is performed prior to the pregelatinization process, the starch or flour is slurried in water, optionally the pH is adjusted to neutral or greater, and the starch or flour is dried, as discussed above, to a moisture content of about 2 to 15%. The starch or flour is then dehydrated to anhydrous or substantially anhydrous and heat treated to thermally inhibit the starch. The resulting inhibited starch or flour can then be reslurried in water and simultaneously pregelatinized and dried.

Suitable bases for use in the pH adjustment step include, but are not limited to, sodium hydroxide, sodium carbonate, tetrasodium pyrophosphate, ammonium orthophosphate, disodium orthophosphate, trisodium phosphate, calcium carbonate, calcium hydroxide, potassium carbonate, and potassium hydroxide, and any other bases approved for use under Food and Drug Administration laws or other regulatory laws. The preferred base is sodium carbonate. It may be possible to use bases not approved under the above regulations provided they can be washed from the starch so that the final product conforms to good manufacturing practices for food use.

The dehydration may be a thermal dehydration or a non-thermal dehydration.

The thermal dehydration is carried out by heating the starch in a conventional oven or a microwave oven, or any other heating device for a time and at a temperature sufficient to reduce the moisture content to less than 1%, preferably 0%. Preferably, the temperatures used to thermally dehydrate the starch are 125° C. or less, more preferably 100° to 120° C. The dehydrating temperature can be lower than 100° C., but a temperature of at least 100° C. will be more efficient for removing moisture.

Representative processes for carrying out the non-thermal dehydration include extracting the water from the granular starch or pregelatinized starch using a solvent, preferably a hydrophilic solvent, more preferably a hydrophilic solvent which forms an azeotropic mixture with water (e.g., ethanol) or freeze drying the granular non-pregelatinized starch or pregelatinized starch.

For a laboratory scale dehydration with a solvent, the starch or flour (about 4–5% moisture) is placed in a Soxhlet thimble which is then placed in the Soxhlet apparatus. A suitable solvent is placed in the apparatus, heated to the reflux temperature, and refluxed for a time sufficient to dehydrate the starch or flour. Since during the refluxing the solvent is condensed onto the starch or flour, the starch or flour is exposed to a lower temperature than the solvent's boiling point. For example, during ethanol (boiling point about 78° C.) extraction the temperature of the starch is only about 40–50° C. When ethanol is used as the solvent, the refluxing is continued for about 17 hours. The extracted starch or flour is removed from the thimble, spread out on a tray, and the excess solvent is allowed to flash off. With ethanol the time required for the ethanol to flash off is about 20–30 minutes. The starch or flour is immediately placed in a suitable heating apparatus for the heat treatment. For a commercial scale dehydration any continuous extraction apparatus is suitable.

For dehydration by freeze drying, the starch or flour (4–5% moisture) is placed on a tray and put into a freeze dryer. A suitable bulk tray freeze dryer is available from FTS Systems of Stone Ridge, N.Y. under the trademark Dura-Tap. The freeze dryer is run through a programmed cycle to remove the moisture from the starch or flour. The starch or flour temperature is held constant at about 20° C. and a vacuum is drawn to about 50 milliTorr (mT). The starch or flour is removed from the freeze dryer and immediately placed into a suitable heating apparatus for the heat treatment.

After it is dehydrated, the starch is heat treated for a time and at a temperature sufficient to inhibit the starch. The preferred heating temperatures are greater than about 100° C. For practical purposes, the upper limit of the heat treating temperature is about 200° C. Typical temperatures are 120–180° C., preferably 140–160° C., most preferably 160° C. The temperature selected will depend upon the amount of inhibition desired and the rate at which it is to be achieved.

The time at the final heating temperature will depend upon the level of inhibition desired. When a conventional oven is used, the times range from 1 to 20 hours, typically 2 to 5 hours, usually 3.5 to 4.5 hours. When a fluidized bed is used, the times range from 0 minutes to 20 hours, typically 0.5–3.0 hours. Longer times are required at lower temperatures to obtain more inhibited starches.

For most applications, the thermal dehydrating and heat treating steps will be continuous and accomplished by the application of heat to the starch beginning from ambient temperature. The moisture will be driven off during the heating and the starch will become anhydrous or substantially anhydrous. Usually, at these initial levels of inhibition, the peak viscosities are higher than the peak viscosities of starches heated for longer times, although there will be greater breakdown in viscosity from the peak viscosity. With continued heat treating, the peak viscosities are lower, but the viscosity breakdowns are less.

The process may be carried out as part of a continuous process involving the extraction of the starch from a plant material.

The process steps may be performed at normal pressures, under vacuum or under pressure, and may be accomplished by conventional means known in the art. The preferred heat treatment method is by the application of dry heat in air or in an inert gaseous environment.

The heat treating step can be carried out in the same apparatus in which the thermal dehydration occurs, and most conveniently the process is continuous with the dehydration and heat treating occurring in the same apparatus, as when a fluidized bed reactor is used. Superior inhibited starches having high viscosities with low percentage breakdown in viscosity are obtained in shorter times in the fluidized bed reactor than can be achieved using other conventional heating ovens or dryers.

The heat treating apparatus can be any industrial ovens, conventional ovens, microwave ovens, dextrinizers, dryers, and mixers and blenders equipped with heating devices or other types of heaters, provided that the apparatus is fitted with a vent to the atmosphere so that moisture does not accumulate and precipitate onto the starch. The preferred apparatus is a fluidized bed. Preferably, the fluidized bed is equipped with a means for removing water vapor, such as, a vacuum or a blower to sweep air or the fluidizing gas from the head-space of the fluidized bed. Suitable fluidizing gases are air and nitrogen. For safety reasons, it is preferable to use a gas containing less than 12% oxygen.

As will be seen in the following examples, the source of the starch, initial pH and moisture content of the starch, the dehydrating method, the heating time and temperature, and equipment used are all interrelated variables that affect the amount of inhibition.

The pregelatinization steps previously described are carried out in such a way that a majority of the starch granules are swollen, but remain intact. Exemplary processes for preparing pregelatinized granular starches are disclosed in U.S. Pat. No. 4,280,851, U.S. Pat. No. 4,465,702, U.S. Pat. No. 5,037,929, and U.S. Pat. No. 5,149,799, the disclosures of which are incorporated by reference.

The amount of pregelatinization, and consequently, whether the starch will display a high or a low initial viscosity when dispersed in water, can be regulated by the pregelatinization procedures. In general, if the pregelatinization step is accomplished by spray-drying, the longer the residence time in the spray nozzle and the higher the ratio of steam to starch, the higher the initial viscosity of the pregelatinized granular starch when it is subsequently dispersed in water. Conversely, the shorter the residence time and the lower the amount of heat and moisture, the lower the initial viscosity of the pregelatinized granular starch when it is subsequently dispersed in water.

The thermal inhibition process and pregelatinization may be carried out prior to or after other starch reactions used to modify starch, such as, heat- and/or acid-conversion, oxidation, phosphorylation, etherification, esterification, chemical crosslinking, enzyme modification, and the like. Usually these modifications are performed before the starch is thermally inhibited. Procedures for modifying starches are described in the chapter "Starch and Its Modification" by M. W. Rutenberg, pages 22–26 to 22–47, Handbook of Water Soluble Gums and Resins, R. L. Davidson, Editor (McGraw-Hill, Inc., New York, N.Y. 1980). These modifications are not preferred in applications where a food manufacturer requires a non-chemically modified starch.

The starches may be inhibited individually or more than one may be inhibited at the same time. The starches may be inhibited in the presence of other materials or ingredients that would not interfere with the thermal inhibition process or alter the properties of the starch product.

Following the thermal inhibition step, the resulting starches may be screened to the desired particle size.

If non-pregelatinized, the starch may be further purified by slurrying water in water filtering, and drying, preferably by spray-drying or flash drying. If the starch is a granular pregelatinized starch, the starch can be washed by any known methods that will maintain granular integrity. If desired, the pH may be adjusted. Optionally, the starch may be bleached.

The thermally-inhibited granular starches or flours, both non-pregelatinized and pregelatinized, may be blended with other unmodified or modified starches, including pregelatinized starches, or with other food ingredients before use in a food product.

Food products wherein the thermally-inhibited starches and flours are useful include thermally-processed foods, acid foods, dry mixes, refrigerated foods, frozen foods, extruded foods, oven-prepared foods, stove top-cooked foods, microwaveable foods, full-fat or fat-reduced foods, and foods having a low water activity. Food products wherein the thermally-inhibited starches are particularly useful are foods requiring a thermal processing step such as pasteurization, retorting, or ultra high temperature (UHT) processing, as described in Volume 217 "Physical Principles of Food Preservation" by M. Karel et al., pp. 31–92 (Marcel Dekker, Inc., New York 1975).

The thermally-inhibited starches are particularly useful in food applications where stability is required through all processing temperatures including cooling, freezing and heating. In food products subjected to temperature cycling operations, such as freeze-thaw cycling, a low temperature freeze-thaw stable starch or flour, e.g., waxy maize, waxy barley, waxy rice starch or flour, amaranth starch or flour, the "V.O." hybrid waxy maize starch of U.S. Pat. No. 4,428,972 or a derivatized starch or flour (e.g., derivatized with hydroxypropyl groups) is preferred.

"Heat penetration" starches are thermally-inhibited starches or thermally-inhibited cross-linked starches which show little viscosity increase during the "kettle cooking" stage of the canning operation (temperatures up to about 85° C.) but which subsequently increase in viscosity during the final retorting or ultra high temperature processing stage (temperatures of about 121° C.), thus allowing for improved heat penetration and viscosity control during thermal processing. Their viscosity during kettle-cooking at about 85° C. is about 50–200 Brabender Units and after retorting processing at 121° C. and cooling their viscosity is about 200–150 Brabender Units. The viscosity is measured at 5% solids using the pressurized VISCO/Amylo/GRAPH procedure described in Example 31.

"Fill viscosity" starches are thermally-inhibited derivatized starches which cook out at a relatively low temperature, e.g., about 85° C., thus developing an initially high viscosity during the kettle cooking stage of the canning operation and thus keeping any particulates in the food suspended, thereby facilitating the container filling stage. The "fill viscosity" starches breakdown in viscosity during the final stage of retorting, thus resulting in a thinner more potable soup-like texture. Their viscosity during kettle-cooking at about 85° C. is about 700–1500 Brabender Units and their viscosity after retorting or ultra high temperature processing at 121° C. and cooling is about 50–500 Brabender Units. The viscosity is measured at 5% solids using the pressurized VISCO/Amylo/GRAPH described in Example 30.

The thermally-inhibited starches are also useful in food products where a non-chemically crosslinked starch thickener, viscosifier, gelling agent, or extender is required. Based on processed food formulations, the practitioner may readily select the amount and type of thermally-inhibited or non-pregelatinized thermally-inhibited pregelatinized starch or flour required to provide the necessary thickness and gelling viscosity in the finished food product, as well as the desired texture. Typically, the starch is used in an amount of 0.1–35%, most preferably 2–6%, by weight, of the food product.

Among the food products which may be improved by the use of the thermally-inhibited non-pregelatinized starches or thermally-inhibited pregelatinized starches are high acid foods (pH <3.7) such as fruit-based pie fillings, baby foods, and the like; acid foods (pH 3.7–4.5) such as tomato-based products; low acid foods (pH >4.5) such as gravies, sauces, and soups; stove top-cooked foods such as sauces, gravies, and puddings; instant foods such as puddings; pourable and spoonable salad dressings; refrigerated foods such as dairy or imitation dairy products (e.g., yogurt, sour cream, and cheese); frozen foods such as frozen desserts and dinners; microwaveable foods such as frozen dinners; liquid products such as diet products and hospital foods; dry mixes for preparing baked goods, gravies, sauces, puddings, baby foods, hot cereals, and the like; and dry mixes for predusting foods prior to batter cooking and frying. The thermally-inhibited starches are also useful in preparing food ingredients such as encapsulated flavors and clouds.

Removal of various proteins, lipids and other off-flavor components prior to thermal inhibition improves the flavor (i.e., taste and aroma) of the resultant thermally-inhibited starches. Sodium chlorite extraction and ethanol extraction of the protein are exemplified hereafter. Other procedures which can be used for protein removal include washing the starch at an alkaline pH (e.g., pH 11–12) and/or treating the starch with proteases. Polar and non-polar solvents which have an affinity for proteins and/or lipids can also be used. The solvents should be food grade solvents. Examples are alcohols such as ethanol or isopropanol.

All the starches and flours used were granular and were provided by National Starch and Chemical Company of Bridgewater, N.J.

The controls for the test samples were from the same native sources as the test samples, were unmodified or modified as the test samples, and were at the same pH, unless otherwise indicated. Control samples were not dehydrated further or heat treated.

All starches and flours, both test and control samples, were prepared and tested individually.

The pH of the samples was raised by slurrying the starch or flour in water at 30–40% solids and adding a sufficient amount of a 5% sodium carbonate solution until the desired pH was reached.

Measurements of pH, either on samples before or after the thermal inhibition steps, were made on samples consisting of one part starch or flour to four parts water.

After the pH adjustments, if any, all granular non-pregelatinized samples were spray dried or flash dried as conventional in the art (without gelatinization) to about 2–15% moisture.

After the pH adjustment, if any, slurries of the starches to be pregelatinized were introduced into a pilot spray dryer, Type 1-KA#4F, from APV Crepaco, Inc., Dryer Division, Attleboro Falls, Mass., using a spray nozzle, Type 1/2J, from Spraying Systems Company of Wheaton, Ill. The spray nozzle had the following configurations: fluid cap 251376, air cap 4691312. The low initial viscosity samples were sprayed at a steam:starch ratio of 3.5–4.5:1, and the high initial cold viscosity samples were sprayed at a steam:starch ratio of 5.5–6.5:1.

Moisture content of all pregelatinized samples after spray drying and before the dehydration step in the thermal inhibition process was 4–10%.

Except where a conventional oven or dextrinizer is specified, the test samples were dehydrated and heat treated in a fluidized bed reactor, model number FDR-100, manufactured by Procedyne Corporation of New Brunswick, N.J. The cross-sectional area of the fluidized bed reactor was 0.05 sq meter. The starting bed height was 0.3–0.8 meter, but usually 0.77 meter. The fluidizing gas was air except where otherwise indicated. When non-pregelatinized granular starches were being heat treated, the gas was used at a velocity of 5–15 meter/min. When pregelatinized granular starches were being heat treated, the gas was used at a velocity of 15–21 meter/min. The side walls of the reactor were heated with hot oil, and the fluidizing gas was heated with an electric heater. The samples were loaded into the fluidized bed and then the fluidizing gas was introduced, or the samples were loaded while the fluidizing gas was being introduced. No difference was noted in the thermally-inhibited samples depending on the order of loading. Unless otherwise specified, the samples were brought from ambient temperature up to 125° C. until the samples became anhydrous and were further heated to the specified heat treating temperatures. When the heating temperature was 160° C., the time to reach that temperature was less than three hours.

The moisture level of the samples at the final heating temperature was 0%, except where otherwise stated. Portions of the samples were removed and tested for inhibition at the temperatures and times indicated in the tables.

The samples were tested for inhibition using the following Brabender Procedures.

Characterization of Inhibition by Texture

Starches or flours with a low to moderate degree of inhibition will exhibit certain textural characteristics when dispersed in an aqueous medium and heated to gelatinization. In the following examples, the granular, non-pregelatinized samples were determined to be inhibited if a heated gelatinized slurry of the starch or flour exhibited a noncohesive, smooth texture.

Brabender Procedure

Granular Non-Pregelatinized Starches

Unless other stated, the following Brabender procedure was used. All samples, except for corn, tapioca, potato, and waxy rice flour, were slurried in a sufficient amount of distilled water to give a 5% anhydrous solids starch slurry. Corn, tapioca, potato, and waxy rice flour were slurried at 6.3% anhydrous solids. The pH was adjusted to pH 3.0 with a sodium citrate, citric acid buffer. The slurry was introduced into the sample cup of a Brabender VISCO/Amylo/GRAPH fitted with a 350 cm/gram cartridge. The starch slurry was heated rapidly to 92° C. and held for 10 minutes.

The peak viscosity and the viscosity ten minutes after peak viscosity were recorded in Brabender Units (BU). The percentage breakdown in viscosity was calculated according to the formula:

$$\% \text{ Breakdown} = \frac{\text{peak} - (\text{peak} + 10')}{\text{peak}} \times 100$$

where "peak" is the peak viscosity in Brabender units, and "(peak+10')" is the viscosity in Brabender Units at ten minutes after peak viscosity.

If no peak viscosity was reached, i.e., the data indicate a rising curve or a flat curve, the viscosity at 92° C. and the viscosity at 30 minutes after attaining 92° C. were recorded.

Using data from Brabender curves, inhibition was determined to be present if, when dispersed at 5% or 6.3% solids in water at 92°–95° C. and pH 3 during the Brabender heating cycle, the Brabender data showed (i) no or almost no viscosity, indicating the starch was so inhibited it did not gelatinize or strongly resisted gelatinization; (ii) a continuous rising viscosity with no peak viscosity, indicating the starch was highly inhibited and gelatinized to a limited extent; (iii) a lower peak viscosity and a lower percentage breakdown in viscosity from peak viscosity compared to a control, indicating a moderate level of inhibition; or (iv) a slight increase in peak viscosity and a lower percentage breakdown compared to a control, indicating a low level of inhibition.

Characterization of Inhibition of Granular Non-Pregelatinized Starches By Brabender Curves Characterization of a thermally-inhibited starch was made more conclusively by reference to a measurement of its viscosity after it was dispersed in water and gelatinized. The instrument used to measure the viscosity is a Brabender VISCO\Amylo\Graph (manufactured by C. W. Brabender Instruments, Inc., Hackensack, N.J.). The VISCO\Amylo\GRAPH records the torque required to balance the viscosity that develops when a starch slurry is subjected to a programmed heating cycle. The accuracy is ±2%.

For non-inhibited starches, the cycle passes through the initiation of viscosity, usually at about 60–70° C., the development of a peak viscosity in the range of 67–95° C., and any breakdown in viscosity when the starch is held at the elevated temperature, usually 92–95° C. The record consists of a curve tracing the viscosity through the heating cycle in arbitrary units of measurement termed Brabender Units (BU).

Inhibited starches will show a Brabender curve different from the curve of the same starch that has not been inhibited (hereinafter the control starch). At low levels of inhibition, an inhibited starch will attain a peak viscosity somewhat higher than the peak viscosity of the control and there may be no decrease in percentage breakdown in viscosity compared to the control. As the amount of inhibition increases, the peak viscosity and the breakdown in viscosity decrease. At high levels of inhibition, the rate of swelling and gelatinization of the granules decreases, the peak viscosity disappears, and with prolonged cooking the Brabender curve becomes a rising curve indicating a slow continuing increase in viscosity. At very high levels the starch granules no longer gelatinize, and the Brabender curve remains flat.

Brabender Procedure

Pregelatinized Granular Starches

The pregelatinized thermally-inhibited granular starch to be tested was slurried in a sufficient amount of distilled water to give a 4.6% anhydrous solids starch slurry at pH 3. A mixture of 132.75 g sucrose, 26.55 g starch, 10.8 g acetic acid, and 405.9 g water were mixed for three minutes in a standard home Mixmaster at setting #1. The slurry was then introduced to the sample cup of a Brabender VISCO/Amylo/GRAPH fitted with a 350 cm/gram cartridge and the viscosity was measured as the slurry was heated to 30° C. and held for 10 minutes. The viscosity at 30° C. and 10 minutes after holding at 30° C. was recorded. The viscosity data at these temperatures are a measurement of the extent of pregelatinization. The higher the viscosity at 30° C., the grater the extent of granular swelling and hydration during the pregelatinization process.

Heating was continued to 95° C. and the slurry was held at that temperature for 10 minutes.

The peak viscosity and viscosity 10 minutes after 95° C. were recorded in Brabender Units (BU) and used to calculate the percentage breakdown according to the formula:

$$\% \text{ Breakdown} = \frac{\text{peak} - (95° \text{ C.} + 10')}{\text{peak}} \times 100$$

where "peak" is the peak viscosity in Brabender Units and "(95° C.+10')" is the viscosity in Brabender Units at 10 minutes after 95° C.

If no peak viscosity was reached, that is, the data indicated a rising curve or a flat curve, the viscosity at 95° C. and the viscosity at 10 minutes after attaining 95° C. were recorded.

Characterization of Inhibition of Pregelatinized Granular Starches by Brabender Curves As discussed above, characterization of a thermally-inhibited starch is made more conclusively by reference to a measurement of its viscosity after it is dispersed in water and gelatinized using the instrument described above.

For pregelatinized starches, the level of viscosity when dispersed in cold water will be dependent on the extent to which the starch was initially cooked out during the pregelatinization process. If the granules are not fully swollen and hydrated during pregelatinization, gelatinization will continue when the starch is dispersed in water and heated. Inhibition is determined by a measurement of the starch viscosity when the starch is dispersed at 4.6% solids in water at pH 3 and heated to 95° C.

When the pregelatinized starch has a high initial cold viscosity, meaning it was highly cooked out in the pregelatinization process, the resulting Brabender traces will be as follows: for a highly inhibited starch, the trace will be a flat curve, indicating that the starch is already very swollen and is so inhibited that the starch is resisting any further gelatinization, or the trace will be a rising curve, indicating that further gelatinization is occurring at a slow rate and to a limited extent; for a less inhibited starch, the trace will show a dropping curve, indicating that some of the granules are fragmenting or will show a second peak, but the overall breakdown in viscosity will be lower than that for a non-inhibited control.

When the pregelatinized starch has a low initial cold viscosity, meaning it was not highly cooked out in the pregelatinization process and more cooking is needed to reach the initial peak viscosity, the resulting Brabender traces will be as follows: for a highly inhibited starch, the trace will be a rising curve, indicating that further gelatinization is occurring at a slow rate and to a limited extent; for a less inhibited starch, the trace will show a peak viscosity as gelatinization occurs and then a drop in viscosity, but with a lower percentage breakdown in viscosity than for a non-inhibited control.

Some of the granular non-pregelatinized starch samples were tested for pasting temperature and/or gelatinization temperature using the following procedures.

Rapid Visco Analyzer (RVA)

This test is used to determine the onset of gelatinization, i.e., the pasting temperature. The onset of gelatinization is indicated by an increase in the viscosity of the starch slurry as the starch granules begin to swell.

A 5 g starch sample (anhydrous basis) is placed in the analysis cup of a Model RVA-4 Analyzer and slurried in water at 20% solids. The total charge is 25 g. The cup is placed into the analyzer, rotated at 160 rpm, and heated from an initial temperature of 50° C. up to a final temperature of 80° C. at a rate of 3° C. per minute. A plot is generated showing time, temperature, and viscosity in centipoises (cP). The pasting temperature is the temperature at which the viscosity reaches 500 cP. Both pasting temperature and pasting time are recorded.

Differential Scanning Calorimetry (DSC)

This test provides a quantitative measurement of the enthalpy ($\Delta H$) of the energy transformation that occurs during the gelatinization of the starch granule. The peak temperature and time required for gelatinization are recorded. A Perkin-Elmer DSC-4 differential scanning calorimeter with data station and large volume high pressure sample cells is used. The cells are prepared by weighing accurately 10 mg of starch (dry basis) and the appropriate amount of distilled water to approximately equal 40 mg of total water weight (moisture of starch and distilled water). The cells are then sealed and allowed to equilibrate overnight at 4° C. before being scanned at from 25–150° C. at the rate of 10° C./minute. An empty cell is used as the blank.

Brookfield Viscometer Procedure

Test samples are measured using a Model RVT Brookfield Viscometer and the appropriate spindle (the spindle is selected based on the anticipated viscosity of the material). In the applications described herein, spindles #3, #4 and #5 are typically used. The test sample, usually a cooked starch paste or food product, is placed in position and the spindle is lowered into the sample to the appropriate height. The viscometer is turned on and the spindle is rotated at a constant speed (e.g., 10 or 20 rpm) for at least 3 revolutions before a reading is taken. Using the appropriate conversion factors, the viscosity (in centipoises) of the sample is recorded.

Bostwick Consistometer Procedure

With the sample cup in the closed position, the test material is loaded into the cup and leveled-off. The gate is opened and the test material is allowed to flow. The distance traveled (in centimeters) over a specific time period (e.g., 60 seconds) is recorded.

Angle of Repose Determination

A large sheet of heavy Kraft paper (about 6 ft. square) is secured to a flat, level surface with masking tape. Two rings (3 in. and 4 in. in diameter) are clampled onto a ring stand (6×9 in. base and 24 in. rod) in such a way that the base faces in the opposite direction from the rings. The small ring is placed above the larger ring. To keep the funnels stationary, 1 in. pieces of heavy walled vacuum tubing (¼ in. base by 3/16 in. wall) are cut lengthwise through one wall and fitted equidistantly at 3 locations on each ring. A chemical funnel (100 mm top interior diameter (Kimax 58) is modified by removing the existing stem and annealing a 8 mm internal diameter glass tubing 85 mm in length as the stem. The modified funnel is placed in the large ring and the height is adjusted so that the orifice of the funnel is 1±0.1 cm above the paper. A powder funnel having a 60 mm top I.D. and 13 mm stem I.D. (Kimax 29020-04) is placed in the small ring and the ring is lowered as far as possible, i.e., until the clamps meet. The small funnel should be centered above the large funnel with the orifice of the large funnel stem parallel to the paper. Approximately 50 g of the sample to be tested are slowly added to the powder funnel while gently placing the top of an index finger over the orifice of the large funnel so that any sample which overflows the powder funnel does not flow out of the large funnel. The finger is slowly removed from the orifice while taking care not to move the funnel and allow the sample to flow onto the paper. Flow will cease when the top of the pile reaches the orifice of the funnel stem. With a pencil, the circumference of the sample pile is traced as accurately as possible without disturbing the sample. The sample is removed and the radius of the pile is measured. Each sample is run in triplicate. The test is repeated if the funnel stem becomes clogged before the pile meets the funnel orifice or if the pile is disturbed in any way. The funnels are cleaned after each run.

The average radius of the sample pile is calculated and the angle of repose is determined using the following formula:

$$\text{Tangent (angle of repose)} = \frac{\text{height of funnel orifice}}{\text{average radius of pile}}$$

EXAMPLES

The following examples will more fully illustrate the embodiments of this invention. In the examples, all parts and percentages are given by weight all temperatures are in degrees Celsius unless otherwise noted. The resultant thermally-inhibited starches are granular and referred to as "T-I" starches unless otherwise indicated. The conditions used for the pH adjustment, if any, and heat treatment are indicated. The time is the heating time at that temperature. When a zero hold time is indicated (e.g., 160° C./0 min), it means the sample is taken as soon as the material reaches that particular temperature (e.g., 160° C.). The initial pH of the starch prior to the dehydration step is indicated. Where the pH of the starch is adjusted, the pH adjustments are done with sodium carbonate unless specified otherwise.

In Examples 1 to 3 the percent moisture is the initial moisture content prior to the thermal inhibition process during which the starch is dehydrated and heat treated.

As indicated above, as the starches are brought from ambient temperature up to the heating temperature, the starches become anhydrous or substantially anhydrous.

Example 1

This example illustrates the preparation of the starches of this invention from a commercial granular waxy maize base starch by the heat treatment process of this invention which was carried out in a conventional oven.

Processing conditions and their effects on viscosity and texture of waxy maize starch are set forth in Tables I and II, below.

To obtain a heat-stable, non-cohesive thickener, samples of granular starch were slurried in 1.5 parts of water, the pH of the slurry was adjusted with the addition of a 5% $Na_2CO_3$ solution and the slurry was agitated for 1 hour, then filtered, dried, and ground. The dry starch samples (150 g) were placed into an aluminum foil pan (4"×5"×1½") and heated in the oven under the conditions described in Tables I and II. Brabender viscosity measurements demonstrated that the most heat-stable starches were obtained by heating at 160° C. and a pH of at least 8.0 for about 3.5 to 6.0 hours.

TABLE I

Process Variables - Granular Waxy Maize Starch

| Sample[1] | pH | Moisture % | Time (Hrs) |
|---|---|---|---|
| | | Heating (160° C.) | |
| 1 | 6.0 | 10.9 | 2 |
| 2 | 6.0 | 10.9 | 4 |
| 3 | 8.2 | 10.6 | 3.5 |
| 4 | 8.2 | 10.6 | 4 |
| 5 | 8.2 | 10.6 | 4.5 |
| 6 | 8.2 | 10.6 | 5.5 |
| 7 | 8.2 | 10.6 | 6 |
| unmodified control[2] | — | | — |
| modified control[3] | — | | — |

| Sample[1] | Viscosity | Texture |
|---|---|---|
| | Cold Evaluation Of[4,5] Gelatinized Samples | |
| 1 | heavy to very heavy | cohesive |
| 2 | thin to moderate | — |
| 3 | heavy to very heavy | cohesive, less than unmodified control |
| 4 | heavy to very heavy | slightly to moderately cohesive |
| 5 | heavy | non-cohesive |
| 6 | heavy, thinnest | non-cohesive |
| 1 | heavy to very heavy | cohesive |
| 7 | moderately heavy | non-cohesive |
| unmodified control[2] | very heavy | cohesive |
| modified control[3] | very heavy | non-cohesive |

[1]All samples were commercial samples of granular waxy maize starch obtained from National Starch and Chemical Company, Bridgewater, New Jersey.
[2]The unmodified control was a commercial granular waxy maize starch obtained from National Starch and Chemical Company, Bridgewater, New Jersey.
[3]The modified control was commercial cross-linked, (phosphorous oxychloride treated) granular waxy maize starch obtained from National Starch and Chemical Company, Bridgewater, New Jersey.
[4]Samples were cooked by slurrying 7.0 g of starch (at 12% moisture) in 91 mls water at neutral pH and heating the starch slurry for 20 minutes in a boiling water bath.
[5]The cold evaluation was carried out at 25° C.

TABLE II

Evaluation Of Granular Waxy Maize Starch

| Sample[1] | pH | Heating Temp. (° C.) | Time (Hrs) |
|---|---|---|---|
| | | Process Variables | |
| 3 | 8.2 | 160 | 3.5 |
| 4 | 8.2 | 160 | 4.0 |
| 5 | 8.2 | 160 | 4.5 |
| 6 | 8.2 | 160 | 5.5 |
| Unmodified control | — | none | none |

TABLE II-continued

Evaluation Of Granular Waxy Maize Starch

| 1 | 6.0 | 160 | 2.0 |
|---|---|---|---|
| 2 | 6.0 | 160 | 4.0 |

| Sample[1] | Brabender Viscosity[2] | |
|---|---|---|
| | Peak Viscosity (B.U.) | Viscosity At 95° C./ 20 Mins. (B.U.) |
| 3 | 985 | 830 |
| 4 | 805 | 685 |
| 5 | 640 | 635 |
| 6 | 575 | 570 |
| Unmodified control | 1640 | 630 |
| 1 | 1055 | 560 |
| 2 | 140 | 80 |

[1]See Table I for a description of samples.
[2]In the Brabender procedure, a sample containing 5.4% anhydrous solids of starch dispersed in water was heated rapidly to 50° C., then the heat was increased by 1.5° C. per minute to 95° C., and held for 20 minutes.

Example 2

This example illustrates that a variety of starches may be processed by the method of this invention to provide a non-cohesive thickener with properties similar to chemically cross-linked starches.

Processing conditions and their effects on viscosity and texture of waxy barley, tapioca, V.O. hybrid and waxy rice starches are set forth in Tables III and IV, below.

TABLE III

Process Variables - Granular Starches

| | | Heating (160° C.) | |
|---|---|---|---|
| Sample[1] | pH | Moisture (%) | Time (Hrs) |
| Waxy Barley Starch | | | |
| 1 | 8.7 | 8.5 | 1.5 |
| 2 | 8.7 | 8.5 | 2.5 |
| 3 | 8.7 | 8.5 | 3.5 |
| 4 | 5.2 | 10.8 | 1.5 |
| 5 | 5.2 | 10.8 | 2.5 |
| Waxy Barley Control | | | 0 |
| Tapioca Starch | | | |
| 6 | 8.8 | 10.3 | 2 |
| 7 | 8.8 | 10.3 | 3 |
| 8 | 8.8 | 10.3 | 4 |
| 9 | 8.8 | 10.3 | 5 |
| Tapioca-Control | | | 0 |
| 10 | 5.5 | 10.9 | 3 |
| Waxy Rice Starch | | | |
| 11 | 9.1 | 9.0 | 2 |
| 12 | 9.1 | 9.0 | 3 |
| 13 | 9.1 | 9.0 | 4 |
| 14 | 9.1 | 9.0 | 5 |
| Waxy Rice Control | | | 0 |

TABLE III-continued

Process Variables - Granular Starches

| Sample[1] | Cold Evaluation Of[2] Gelatinized Sample | |
|---|---|---|
| | Viscosity | Texture |
| Waxy Barley Starch | | |
| 1 | heavy | cohesive |
| 2 | heavy | slightly moderate cohesive |
| 3 | moderate heavy to heavy | non-cohesive |
| 4 | thin | |
| 5 | thin/thinnest | |
| Waxy Barley Control | heavy | cohesive |
| Tapioca Starch | | |
| 6 | heavy to very heavy | cohesive |
| 7 | heavy to very heavy | cohesive/less than Sample 6 |
| 8 | heavy to very heavy | slightly moderately cohesive slightly lumpy |
| 9 | heavy | non-cohesive lumpy |
| Tapioca-Control | very heavy | cohesive |
| 10 | moderately heavy | — |
| Waxy Rice Starch | | |
| 11 | very heavy | cohesive |
| 12 | heavy | slightly moderately cohesive |
| 13 | heavy | slightly cohesive |
| 14 | moderately heavy to heavy | non-cohesive |
| Waxy Rice Control | very heavy | cohesive |

[1]Tapioca starch samples were commercial granular starch obtained from National Starch and Chemical Company, Bridgewater, New Jersey. Waxy barley starch samples were commercial granular starch obtained from Alko, Finland. Waxy rice starch samples were commercial granular starch obtained from Mitsubishi Corporation, Japan.
[2]Samples were cooked by slurring 7.5 g of starch at 12% moisture in 100 mls of water and heating the starch slurry for 20 minutes in a boiling water bath.

TABLE IV

Process Variables - Granular Starches

| Sample[1] | pH | Moisture % | Heating (160° C.) Time (Hrs) |
|---|---|---|---|
| V.O. Hybrid Starch | | | |
| 1 | 8.7 | 10.5 | 2.0 |
| 2 | 8.7 | 10.5 | 3.0 |
| 3 | 8.7 | 10.5 | 4.0 |
| 4 | 8.7 | 10.5 | 5.0 |
| 5 | 8.7 | 10.5 | 6.0 |
| V.O. Hybrid Control | 5.9 | 11.4 | 0 |

| Sample[1] | Cold Evaluation Of[2] Gelatinized Sample Viscosity/Texture | |
|---|---|---|
| V.O. Hybrid Starch | | |
| 1 | heavy | cohesive very slightly less than control |
| 2 | heavy | slightly moderate cohesive |
| 3 | moderate heavy to heavy | smooth, very slightly cohesive |
| 4 | moderately heavy | smooth, short, non-cohesive |
| 5 | moderate | smooth, short, non-cohesive |
| V.O. Hybrid Control | heavy | cohesive |

[1]V.O. hybrid starch samples were granular starches from National Starch and Chemical Company, Bridgewater, New Jersey.
[2]Samples were cooked by slurring 7.5 g of starch at 12% moisture in 100 mls of water and heating the starch slurry for 20 minutes in a boiling water bath.

The viscosity and texture evaluation results show that a non-cohesive, heat-stable starch thickener may be prepared from waxy barley, V.O. hybrid, tapioca and waxy rice starches by the process of this invention. The amount of inhibition (non-cohesive, thickening character in cooked aqueous dispersion) increased with increasing time of heat treatment.

Example 3

This example illustrates the effects of temperature and pH, and starch moisture content during heating on the viscosity and texture of the treated starch.

Part A

A waxy maize starch sample (100 g) containing 20.4% moisture was heated in an oven at 100° C. for 16 hours in a sealed glass jar. A second sample was heated for 4 hours and a third sample was heated for 7 hours under the same conditions. The product viscosity and texture were compared to a 12.1% moisture granular waxy maize starch control using the cook evaluation method of Example 1, Table I. Results are shown in Table V, below.

TABLE V

Effect Of Process Moisture

| | Sample[1] Waxy Maize Starch | Process Variables[2] Heat Time (Hours) | Cold Evaluation of Gelatinized Starch[3] | |
|---|---|---|---|---|
| | | | Viscosity | Texture |
| 1. | Test (20.4% $H_2O$) | 16 | heavy, slightly thinner than control | cohesive |
| 2. | Control (12.1% $H_2O$) | 0 | heavy | cohesive |
| 3. | Test (20.4% $H_2O$) | 4 | heavy | cohesive |
| 4. | Control (12.1% $H_2O$) | 0 | heavy | cohesive |
| 5. | Test (20.4% $H_2O$) | 7 | heavy | cohesive |
| 6. | Control (12.1% $H_2O$) | 0 | heavy | cohesive |

[1]Samples were obtained from National Starch and Chemical Company, Bridgewater, New Jersey.
[2]Process was conducted at pH 5.2.
[3]See Table III for cook conditions.

The results demonstrate that moisture present during the heating process yields a product which is as cohesive and undesirable as a control starch which had not been thermally-treated by the process of this invention.

Part B

Samples (900 g) of a commercial granular waxy maize starch (obtained from National Starch and Chemical Company, Bridgewater, N.J.) were placed in a 10"×15"×0.75" aluminum tray and heated in an oven at 180° C. for 15, 30, 45 and 60 minutes. The pH of the starch was not adjusted and remained at about 5.2 during the heating process. Sample viscosity and texture were evaluated by the method of Example 1.

As shown in Table VI, below, the pH 5.2 samples were characterized by an undesirable, cohesive texture similar to that of a waxy maize starch control which had not been thermally-treated.

TABLE VI

Effect Of Acidic Process pH

| Sample[1] Waxy Maize Starch | Process Variables[2] Heat Time (Hours) | Cold Evaluation Of Gelatinized Starch[3] | |
|---|---|---|---|
| | | Viscosity | Texture |
| 1 | 15 | very heavy | cohesive |
| 2 | 30 | very heavy | cohesive |
| 3 | 45 | very heavy | cohesive |
| 4 | 60 | heavy to very heavy | cohesive |
| Control | 0 | very heavy | cohesive |

TABLE VI-continued

Effect Of Acidic Process pH

| Sample[1] Waxy Maize Starch | Process Variables[2] Heat Time (Hours) | Cold Evaluation Of Gelatinized Starch[3] | |
|---|---|---|---|
| | | Viscosity | Texture |

[1]The pH was not adjusted from that of the native waxy maize starch (pH = 5.2) and Samples 1–4 correspond to starch treated by the process of U.S. Pat. No. 4,303,451 (no pH adjustment).
[2]See Table III for cook conditions.

Thus, a combination of selected factors, including the pH, moisture content and the type of native starch, determine whether a desirable, non-cohesive, heat-stable starch thickener is produced by the process of this invention.

Example 4

This example shows carrying out the thermal inhibition (i.e., thermal dehydration and heat treatment) in the fluidized bed previously described. The effects of temperature and time on the level of inhibition of waxy maize starch at pH 9.5 are shown below:

| Heating Temperature | Time At Heating Temperature (hours) | Peak Viscosity (B.U.) | Peak + 10 min (B.U.) | Break-down (%) |
|---|---|---|---|---|
| Control | — | 1135 | 405 | 64.3 |
| 110° C. | 22 | 1185 | 215 | 18.1 |
| 160° C. | 0 | 1055 | 175 | 16.6 |
| 160° C. | 2 | 665 | 5 | 0.7 |
| 175° C. | 0 | 850 | 95 | 11.2 |
| 180° C. | 0 | 715 | 35 | 4.9 |
| 190° C. | 0 | 555 | 5 | 0.9 |
| 200° C. | 0 | rising curve | — | — |
| 200° C. | 2 | no gelatinization | — | — |

The data shows that thermally-inhibited anhydrous or substantially anhydrous samples can be obtained at heat treating temperatures between 100–200° C., with more inhibition obtained at higher temperatures or at longer times at lower temperatures. The starch samples heated at 200° C. were highly inhibited (rising curves) or completely inhibited (no gelatinization).

Example 5

This example illustrates the preparation of pregelatinized thermally-inhibited granular starches wherein the pregelatinization step, as described below, is carried out prior to the thermal inhibition process (i.e., thermal dehydration and heat treatment). The fluidized bed process described previously was used.

Starch slurries (30–40% solids), pH adjusted to 6, 8, and 10 with a 5% sodium carbonate solution, were pregelatinized in a pilot size spray drier, Type-1-KA#4F, from APV Crepaco, Inc., Dryer Division, of Attle Boro Falls, Mass., using a spray nozzle, Type 1/2 J, from Spraying Systems Company of Wheaton, Ill. The spray nozzle had the following configuration: fluid cap, 251376, and air cap, 4691312.

The resultant pregelatinized thermally-inhibited granular starches were evaluated for inhibition. The results are shown below:

| | Viscosity (B.U.) | | | | | Break-down (%) |
|---|---|---|---|---|---|---|
| | 30° C. | 30° C. + 10 min | Peak | 95° C. | 95° C. + 10 min | |
| High Initial Viscosity Pregel Waxy Maize (pH 6.0) | | | | | | |
| Control Time at 160° C. (min) | 1280 | 960 | — | 170 | 90 | — |
| 0 | 700 | 980 | 700 | 610 | 370 | 47 |
| 30 | 600 | 910 | 720 | 690 | 370 | 49 |
| 90 | 450 | 780 | 915 | 740 | 400 | 56 |
| 150 | 360 | 590 | 925 | 800 | 500 | 46 |
| Low Initial Viscosity Pregel Waxy Maize (pH 6.0) | | | | | | |
| Control Time at 160° C. (min) | 230 | 250 | 750 | 340 | 100 | 87 |
| 30 | 100 | 130 | 600 | 370 | 210 | 65 |
| 60 | 100 | 140 | 730 | 500 | 260 | 64 |
| 120 | 100 | 130 | 630 | 430 | 260 | 59 |
| 180 | 90 | 120 | 550 | 390 | 240 | 56 |
| High Initial Viscosity Pregel Waxy Maize (pH 8.0) | | | | | | |
| Control Time at 160° C. (min) | 1400 | 1020 | — | 270 | 100 | — |
| 0 | 700 | 1060 | 1050 | 760 | 280 | 73 |
| 60 | 260 | 600 | 1340 | 1200 | 780 | 42 |
| 90 | 240 | 440 | 1280 | 1240 | 1000 | 22 |
| 120 | 280 | 420 | 1320 | 1320 | 1280 | 3 |
| 150 | 120 | 200 | 860 | 860 | 820 | 7 |
| 180 | 180 | 260 | 980 | 980 | 920 | 8 |
| Low Initial Viscosity Pregel Waxy Maize (pH 8.0) | | | | | | |
| Control Time at 160° C. (min) | 250 | 250 | 820 | 340 | 130 | 84 |
| 0 | 50 | 100 | 690 | 460 | 270 | 61 |
| 60 | 40 | 50 | 840 | 590 | 320 | 62 |
| 120 | 20 | 30 | 720 | 650 | 450 | 38 |
| 180 | 20 | 30 | 590 | 570 | 450 | 24 |
| High Initial Viscosity Pregel Waxy Maize (pH 10) | | | | | | |
| Control Time (min) | 1010 | 740 | — | 300 | 160 | — |
| 140° C./0 | 550 | 850 | 1280 | 1080 | 750 | 41 |
| 150° C./0 | 270 | 420 | 1680 | 1680 | 1540 | 8 |
| 160° C./0 | 170 | 240 | — | 1180 | 1440 | ris. visc.[1] |
| 160° C./30 | 80 | 85 | — | 410 | 650 | ris. visc. |
| 160° C./60 | 60 | 60 | — | 150 | 300 | ris. visc |
| High Initial Viscosity Pregel Waxy Maize (pH 10) | | | | | | |
| 160° C./90 | 50 | 50 | — | 80 | 140 | ris. visc |
| 160° C./120 | 40 | 40 | — | 80 | 130 | ris. visc |
| 160° C./150 | 40 | 40 | — | 60 | 90 | ris. visc |
| 160° C./180 | 40 | 40 | — | 45 | 70 | ris. |

-continued

| | Viscosity (B.U.) | | | | | Break-down (%) |
|---|---|---|---|---|---|---|
| | 30° C. | 30° C. + 10 min | Peak | 95° C. | 95° C. + 10 min | |

Low Initial Viscosity Pregel Waxy Maize (pH 10)

| Control Time (min) | 200 | 190 | 615 | 350 | 190 | — |
|---|---|---|---|---|---|---|
| 130° C./0 | 110 | 180 | 1500 | 880 | 530 | 65 |
| 150° C./0 | 50 | 80 | 1670 | 1540 | 1250 | 25 |
| 160° C./0 | 30 | 30 | — | 1040 | 1320 | ris. visc.[1] |
| 160° C./30 | 30 | 30 | — | 380 | 640 | ris. visc. |
| 160° C./60 | 30 | 30 | — | 150 | 310 | ris. visc. |
| 160° C./90 | 10 | 10 | — | 50 | 120 | ris. visc. |

[1] ris. visc. is equal to rising viscosity.

The data show some thermal inhibition was attained in all cases and that increasing the initial pH and the time of heating increased the level of inhibition. For the samples at pH 6.0, at 0 and 30 minutes, the recorded peak was actually a second peak obtained after the initial high viscosity began to breakdown. For some of the samples at pH 10, no peak viscosity was reached, indicating a highly inhibited starch.

Example 6

This example shows that the starch can be dehydrated by ethanol extraction.

A granular waxy maize starch was slurried in 1.5 parts water based on the weight of the starch and adjusted to pH 7 and 9.5 with 5% sodium carbonate, held for 30 minutes, filtered, and dried on a tray to a moisture content of about 5–6% moisture. The starch having the pH of 5.3 was a native starch which was not pH adjusted.

For the dehydration, the dried pH 5.3, pH 7.0, and pH 9.5 starches were each separated into two samples. One sample was dried on trays in a forced draft oven at 80° C. overnight to thermally dehydrate the starch to <1% (0%) moisture. The other sample was placed in a Soxhlet extractor and allowed to reflux overnight (about 17 hours) with anhydrous ethanol (boiling point 78.32° C.). The ethanol-extracted sample was placed on paper so that the excess alcohol could flash off which took about 30 minutes. The ethanol-extracted starch was a free flowing powder which was dry to the touch.

For the heat treatment, the oven-dehydrated starches and ethanol-extracted starches were placed on trays in a forced draft oven and heated for 3, 5, and 7 hours at 160° C.

The thermally-inhibited (T-I) starches and the controls were evaluated using the Brabender Procedure previously described.

BRABENDER RESULTS

| Base | pH | Dehydration Method | Heat Treatment | Viscosity (BU) | | |
|---|---|---|---|---|---|---|
| | | | | Peak | Peak + 10' | Breakdown |
| Waxy Maize* | 5.3 | — | — | 1245 | 330 | 74% |
| Waxy** Maize | 5.3 | oven | — | 1290 | 350 | 73% |
| Waxy** Maize | 5.3 | ethanol | — | 1205 | 245 | 80% |
| T-I Waxy Maize | 5.3 | oven | 5 hrs. at 160° C. | 95 | 45 | 53% |
| T-I Waxy Maize | 5.3 | ethanol | 5 hrs. at 160° C. | 255 | 185 | 28% |
| T-I Waxy Maize | 5.3 | oven | 7 hrs. at 160° C. | 60 | 35 | 42% |
| T-I Waxy Maize | 5.3 | ethanol | 7 hrs. at 160° C. | 165 | 105 | 36% |
| T-I Waxy** Maize | 7.0 | oven | — | 1240 | 380 | 69% |
| T-I Waxy Maize | 7.0 | oven | 7 hrs. at 160° C. | 298 | 240 | 20% |
| T-I Waxy Maize | 7.0 | ethanol | 7 hrs. at 160° C. | 400 | 310 | 23% |
| Waxy Maize** | 9.5 | Oven | — | 1250 | 400 | 68% |
| Waxy Maize** | 9.5 | Ethanol | — | 1070 | 350 | 67% |
| T-I Waxy Maize | 9.5 | Ethanol | 3 hrs at 160° C. | 665 | 635 | 5% |
| T-I Waxy Maize | 9.5 | Oven | 3 hrs at 160° C. | 680 | 655 | 4% |
| T-I Waxy Maize | 9.5 | Oven | 5 hrs. at 160° C. | 245 | 460 | rising curve |
| T-I Waxy Maize | 9.5 | Ethanol | 5 hrs. at 160° C. | 160 | 375 | rising curve |
| T-I Waxy Maize | 9.5 | Oven | 7 hrs. at 160° C. | 110 | 295 | rising curve |
| T-I Waxy Maize | 9.5 | Ethanol | 7 hrs. at 160° C. | 110 | 299 | rising curve |

*Base starch.
**Controls.

Both of the thermally-inhibited pH 7 starches were higher in viscosity than the pH 5.3 (as is) thermally-inhibited starches. The starches which were thermally-inhibited at pH 9.5 were moderately highly inhibited or highly inhibited (rising curve).

Example 7

Using the procedure described in Example 6, tapioca, corn and waxy rice starches and waxy rice flour were adjusted to pH 9.5, dehydrated in an oven and by extraction with ethanol, and heat treated at 160° C.

The Brabender results are shown below.

| Base | pH | Dehydration Method | Heat Treatment | Viscosity (BU) Peak | Peak + 10' | Breakdown |
|---|---|---|---|---|---|---|
| Tapioca* | 9.5 | oven | — | 745 | 330 | 58% |
| Tapioca* | 9.5 | ethanol | — | 720 | 330 | 54% |
| T-I Tapioca | 9.5 | oven | 5 hrs. at 160° C. | 270 | 260 | 3% |
| T-I Tapioca | 9.5 | ethanol | 5 hrs. at 160° C. | 260 | 258 | 1% |
| T-I Tapioca | 9.5 | oven | 7 hrs. at 160° C. | 110 | 155 | rising curve |
| T-I Tapioca | 9.5 | ethanol | 7 hrs. at 160° C. | 100 | 145 | rising curve |
| Corn* | 9.5 | oven | — | 330 | 280 | 15% |
| Corn* | 9.5 | ethanol | — | 290 | 250 | 14% |
| T-I Corn | 9.5 | oven | 5 hrs. at 160° C. | 10 | 80 | rising curve |
| T-I Corn | 9.5 | ethanol | 5 hrs. at 160° C. | 10 | 170 | rising curve |
| T-I Corn | 9.5 | oven | 7 hrs. at 160° C. | 10 | 65 | rising curve |
| T-I Corn | 9.5 | ethanol | 7 hrs. at 160° C. | 10 | 45 | rising curve |
| Waxy Rice* | 9.5 | oven | — | 1200 | 590 | 50.8% |
| Waxy Rice* | 9.5 | ethanol | — | 1155 | 450 | 61.0% |
| T-I Waxy Rice | 9.5 | oven | 5 hrs. at 160° C. | 518 | 640 | rising curve |
| T-I Waxy Rice | 9.5 | oven | 7 hrs. at 160° C. | 265 | 458 | rising curve |
| T-I Waxy Rice | 9.5 | ethanol | 7 hrs. at 160° C. | 395 | 520 | rising curve |
| Waxy Rice Flour* | 9.5 | oven | — | 895 | 700 | 22% |
| Waxy Rice Flour* | 9.5 | ethanol | — | 870 | 410 | 53% |
| T-I Waxy Rice Flour | 9.5 | oven | 5 hrs. at 160° C. | 38 | 73 | rising curve |
| T-I Waxy Rice Flour | 9.5 | ethanol | 5 hrs. at 160° C. | 140 | 260 | rising curve |
| T-I Waxy Rice Flour | 9.5 | oven | 7 hrs. at 160° C. | 10 | 16 | rising curve |
| T-I Waxy Rice Flour | 9.5 | ethanol | 7 hrs. at 160° C. | 40 | 100 | rising curve |

*Controls.

The results show that pH 9.5 adjusted ethanol-extracted, heat-treated tapioca and corn starches had viscosity profiles generally similar to those of the same thermally-inhibited starches which were oven-dehydrated. The 7 hours heat-treated samples were more inhibited than the 5 hour heat-treated samples.

Example 8

This example compares ethanol-extracted waxy maize starches and oven-dehydrated waxy maize starches which were heat treated in an oven for 5 and 7 hours at 160° C. The starches were adjusted to pH 8.03 prior to the dehydration.

The Brabender results are shown below.

| Dehydration/ Heat Treatment | Viscosity (BU) Peak | Peak +10' | Breakdown |
|---|---|---|---|
| Oven/None | 1160 | 360 | 69% |
| EtOH/None | 1120 | 370 | 67% |
| Oven/5 hrs. | 510 | 455 | 11% |
| EtOH/5 hrs. | 490 | 445 | 9% |
| Oven/7 hrs. | 430 | 395 | 8% |
| EtOH/7 hrs. | 360 | 330 | 8% |

The thermally-inhibited starches were slurried at 6.6% solids (anhydrous basis), pH adjusted to 6.0–6.5, and then cooked out in a boiling water bath for 20 minutes. The resulting cooks were allowed to cool and then evaluated for viscosity, texture, and color.

| Method of Dehydration | Time at 140° C. | Viscosity | Texture | Color |
|---|---|---|---|---|
| Oven | None | heavy to very heavy | cohesive | slightly off-white |
| Ethanol | None | heavy to very heavy | cohesive | slightly off-white |
| Oven | 5 hours | moderately heavy to heavy | non-cohesive, smooth | slightly tan, darker* |
| Ethanol | 5 hours | moderately heavy to heavy | non-cohesive, smooth | slightly tan |
| Oven | 7 hours | moderately heavy to heavy | non-cohesive, smooth | moderately tan, darker* |
| Ethanol | 7 hours | moderately heavy to heavy | non-cohesive, smooth | moderately tan |

*Slightly darker than ethanol-dehydrated samples.

These Brabender results show that highly inhibited starches can be obtained by both thermal and non-thermal dehydration. The cook evaluation results show that there is a benefit for the ethanol-dehydrated, thermally-inhibited starches in terms of reduced color. As will be shown hereafter, there is also a flavor improvement with ethanol dehydration.

Example 9

A waxy maize starch was pH adjusted to pH 9.5 using the procedure described in Example 6. The starch was then placed in a freeze dryer and dried for 3 days until it was anhydrous (0% moisture). The freeze-dried (FD) starch was heat treated for 6 and 8 hours at 160° C. in a forced draft oven.

Brabender evaluation were run. The results are shown below:

| Base | pH | Dehydration Method | Heat Treatment | Viscosity (BU) Peak | Peak + 10' | Breakdown |
|---|---|---|---|---|---|---|
| Waxy Maize* | 9.5 | — | — | 1260 | 320 | 75% |
| Waxy Maize** | 9.5 | FD | — | 1240 | 320 | 74% |

-continued

| Base | pH | Dehydration Method | Heat Treatment | Viscosity (BU) Peak | Peak + 10' | Breakdown |
|---|---|---|---|---|---|---|
| T-I Waxy Maize | 9.5 | FD | 160° C./ 6 hrs. | 340 | 465 | rising curve |
| T-I Waxy Maize | 9.5 | FD | 160° C./ 8 hrs. | 285 | 325 | rising curve |

*Base starch.
**Control.

The results show that the starch can be dehydrated by freeze drying and that the subsequent heat treatment is necessary to inhibit the starch. The starches are highly inhibited as shown by their rising viscosity.

Example 10

This example shows that thermal inhibition reduced the gelatinization temperature of the waxy maize starches.

The gelatinization temperature of an untreated waxy maize, a thermally-inhibited (T-I) waxy maize (pH adjusted and not pH adjusted), and chemically-crosslinked (X-linked) waxy maize starches (0.02%, 0.04%, and 0.06% phosphorus oxychloride) were determined by Differential Scanning Calorimetry. The starches were thermally dehydrated and heat treated in an oven for the indicated time and temperature.

The gelatinization temperature and enthalapy (ΔH) are shown below.

| Starch | Gelatinization Temperature (° C.) | Enthalapy ΔH (cal/g) |
|---|---|---|
| Waxy Maize | 74 | 4.3 |
| T-I Waxy Maize (pH 9.5/160° C. for 8.5 hrs.) | 68 | 2.9 |
| T-I Waxy Maize (pH 6/160° C. for 8 hrs.) | 59 | 2.8 |
| X-linked Waxy Maize (0.02% POCl₃) | 73 | 4.4 |
| X-linked Waxy Maize (0.04% POCl₃) | 72 | 4.2 |
| X-linked Waxy Maize (0.06% POCl₃) | 74 | 4.2 |

The results show that there was a significant reduction in peak gelatinization temperature of the thermally inhibited (T-I) starches. The heat treatment reduced the enthalapy (ΔH) from 4.7 cal/g for the unmodified starch to 2.8–2.9 cal/g for the thermally-inhibited starch. The chemically crosslinked (X-linked) starches are essentially identical to the unmodified waxy starch in peak temperature (72–74° C. vs. 74° C.) and enthalapy (4.2–4.4 vs 4.3 cal/g). The reduced gelatinization temperature and decrease in enthalapy suggest that the overall granular structure has been altered by the dehydration and heat treatment.

Example 11

This example shows the correlation between the RVA pasting temperature and time and DSC peak gelatinization temperature and time and the reduction in Brabender viscosity breakdown for various starch bases and for waxy maize starches dehydrated by various methods including heating, ethanol extraction, and freeze drying. The base starches were unmodified. The starches were all adjusted to pH 9.5 before dehydration. The ethanol-extracted and freeze-dried controls were pH adjusted and dehydrated but not heat treated. The dehydrated starches were all heat treated in an oven except for the starches chemically crosslinked with sodium trimetaphosphate (STMP) which were heat treated in the fluidized bed.

The results are shown below.

| Starch | Pasting Temp. (° C.) | Pasting Time (min) | DSC Peak Temp. (° C.) | DSC Peak Time (min) | Viscosity (B.U.) Peak | Peak +10' | Breakdown (%) |
|---|---|---|---|---|---|---|---|
| Tapioca | 68.20 | 3.7 | 70.61 | 6.6 | 1595 | 440 | 72.41 |
| Dehydrated Thermally In Oven | | | | | | | |
| T-I Tapioca (160° C. for 2 hrs.) | 66.65 | 3.4 | 68.31 | 6.3 | 1230 | 560 | 54.47 |
| T-I Tapioca (160° C. for 6 hrs.) | 64.20 | 2.9 | 65.41 | 6.0 | 355 | 335 | 5.63 |
| Potato | 61.05 | 2.3 | 62.67 | 5.8 | 1825 | 1010 | 44.66 |
| Dehydrated Thermally In Oven | | | | | | | |
| T-I Potato (160° C. for 3 hrs.) | 60.25 | 2.1 | 61.41 | 5.6 | 995 | 810 | 18.59 |
| T-I Potato* (160° C. for 6 hrs.) | 60.20 | 2.1 | 61.13 | 5.6 | ris. | ris. | ris. |
| Waxy Maize | 70.95 | 4.3 | 73.86 | 6.9 | 1215 | 350 | 71.79 |
| Dehydrated Thermally In Oven | | | | | | | |
| T-I Waxy Maize (160° C. for 8 hrs.) | 68.15 | 3.7 | 70.71 | 6.6 | 760 | 720 | 5.26 |
| Dehydrated by Ethanol Extraction | | | | | | | |
| T-I Waxy Maize (Control) | 70.95 | 4.3 | 74.23 | 6.9 | 1250 | 400 | 68.00 |
| T-I Waxy Maize (160° C. for 2 hrs.) | 65.00 | 3.1 | 71.81 | 6.7 | ris. | ris. | ris. |
| T-I Waxy Maize (160° C. for 7 hrs.) | 63.85 | 2.8 | 68.12 | 6.3 | ris. | ris. | ris. |
| Dehydrated by Freeze Drying | | | | | | | |
| Waxy Maize (Control) | 71.30 | 4.4 | 74.16 | 6.9 | 1240 | 320 | 74.19 |

-continued

| Starch | Pasting Temp. (° C.) | Pasting Time (min) | DSC Peak Temp. (° C.) | DSC Peak Time (min) | Viscosity (B.U.) Peak | Viscosity (B.U.) Peak +10' | Break-down (%) |
|---|---|---|---|---|---|---|---|
| T-I Waxy Maize (160° C. for 6 hrs.) | 69.50 | 4.0 | 66.09 | 6.1 | ris. | ris. | ris. |
| T-I Waxy Maize (160° C. for 8 hrs.) | 66.75 | 3.5 | 64.64 | 6.0 | ris. | ris. | ris. |
| Cross-linked Waxy Maize (0.12% STMP) (Control) | 71.70 | N.D. | 74.33 | 6.9 | ris. | ris. | ris. |
| Dehydrated Thermally In Fluidized Bed | | | | | | | |
| Cross-linked T-I Waxy Maize (0.12% STMP) (160° C. for 30 min.) | 69.10 | N.D. | 71.66 | 6.7 | ris. | ris. | ris. |
| Cross-linked T-I Waxy Maize (0.12% STMP) (160° C. for 30 min.) | 66.00 | N.D. | 67.14 | 6.2 | ris. | ris. | ris. | ris. indicates a rising curve

The results show that heat treatment of thermally and non-thermally dehydrated starches reduced the pasting and peak gelatinization temperatures while at the same time inhibiting the viscosity breakdown. Because the gelatinization temperature has been lowered by the heat treatment of the dehydrated starch, less time is required to reach the pasting and gelatinization temperatures. The more highly inhibited starches showed a lower pasting temperature and less breakdown in viscosity.

Example 12

This example measures the flow properties of the thermally-inhibited starches by determining the angle of repose. The angle of repose is an indication of performance with regard to mobility/flow.

The starches evaluated are shown below:

| No. | Starch Base | pH | Temperature (° C.) | Time at Final Temperature (min.) | Angle of Repose* |
|---|---|---|---|---|---|
| 1 | Waxy Maize | 9.5 | 160 | 30 | 24.17 |
| 2 | Waxy Maize | 9.5 | 160 | 60 | 26.75 |
| 3 | Waxy Maize | 9.5 | 160 | 180 | 23.60 |

*Average of 5 readings.

The control did not flow. The thermally-inhibited starches had good flow properties.

The angle of repose of native corn starch and chemically crosslinked and derivatized waxy corn starch could not be measured because the funnels were completely blocked upon addition of the sample. These starches would not even flow through powder funnels with larger I.D. orifices without constant tapping.

Example 13

This example shows that the thermally-inhibited starches and flours are essentially sterilized by the heat-treatment and remain sterile when properly stored.

Part A

Thermally-Inhibited Waxy Rice Flour

The flour was adjusted to pH 9.5 and thermally inhibited in the fluidized bed as previously described and stored for about 3 months in a non-sterilized, covered glass container. The thermally-inhibited flours and the control flour were microbiologically tested for their total plate count using the procedure described on pages 17–19 of Chapter 3 "Aerobic Plate Count" by J. T. Peeler and L. J. Maturin, FDA Bacteriological Analytical Manual, 7th Ed. (A.O.A.C. International, Arlington, Va. 1992). The results are shown below:

| | Plate Count (CFU)[1] |
|---|---|
| Waxy Rice Flour (no heat treatment) | 7500 |
| T-I Waxy Rice Flour (160° C./0 min sample) | <10 |
| T-I Waxy Rice Flour (160° C./60 min sample) | <10 |
| T-I Waxy Rice Flour (160° C./120 min sample) | <10 |

[1]Colony forming units.

Part B

Thermally-Inhibited Waxy Maize Starch

The starch was adjusted to pH 9.5 and thermally dehydrated and inhibited in the fluidized bed as previously described and stored for about 2 months in non-sterilized, covered glass containers. The thermally-inhibited starches and the control starch were microbiologically tested for their total plate count using the above procedure. The results are shown below.

|  | Plate Count (CFU)[1] |
|---|---|
| Waxy Maize Starch (no heat treatment) | 2000 |
| T-I Waxy Maize Starch (160° C./0 min sample) | <10 |
| T-I Waxy Maize Starch (160° C./60 min sample) | <10 |
| T-I Waxy Maize Starch (160° C./120 min sample) | <10 |

[1]Colony forming units.

The above results are particularly interesting, especially since the thermally-inhibited flours and starches were not handled using aseptic techniques. If stored and maintained under sterile conditions, these starches should be useful in products where microbiological considerations are of concern.

Example 14

This example shows the effect of protein removal on the flavor (i.e., taste and smell) of a thermally-inhibited waxy maize.

Prior to the thermal inhibition process, the protein was extracted from a waxy maize starch as follows. The starch was slurried at W=1.5 (50 lbs starch to 75 lbs of water) and the pH was adjusted to 3–3.5 with sulfuric acid. Sodium chlorite was added to give 2% on the weight of the starch. The starch was steeped overnight at room temperature. The pH was raised to about 9.5 using a 3% sodium hydroxide solution and washed well prior to drying. The protein level of the starch was reduced to about 0.1%. The protein extracted starch and untreated starch were thermally dehydrated and heat treated in the fluidized bed as previously described. The protein level of the thermally-inhibited waxy maize control (pH 9.5) was about 0.3%.

Using a one-sided, directional difference taste testing procedure, as described in "Sensory Evaluation Techniques" by M. Meilgaard et al., pp. 47–111 (CRC Press Inc., Boca Raton, Fla. 1987), the protein-reduced, thermally-inhibited waxy maize (pH 9.5; 160° C./90 min) was compared to the thermally-inhibited waxy maize (pH 9.5; 160° C./90 min) which had not been protein-reduced prior to heat treatment.

For the taste test, 3% starch cooks (samples heated at 100° C. for 15 min) were prepared and panelists were asked to select which sample was "cleaner" in flavor. All tests were done in a sensory evaluation room under red lights in order to negate any color differences that may have been present between samples. The results are shown below:

| Trial # | Number of Panelists | Number of Positive Responses[1] | Significance Level (α risk)[2] |
|---|---|---|---|
| 1 | 15 | 12 | 5% |
| 2 | 14 | 11 | 5% |

[1]The number indicates those respondents who selected the protein-reduced product as being cleaner in flavor.
[2]The α values were determined from a statistical table. An α risk of 5% indicates (with 95% confidence) that the samples are statistically different, i.e., that the protein-reduced product is cleaner than the control.

The results show that protein removal prior to the heat treatment helps to improve the flavor of the thermally-inhibited waxy maize starches.

Example 15

This example shows that alcohol dehydration provides better tasting thermally-inhibited starches.

The test performed was a "Triangle Taste Test" which employs three coded samples, two identical and one different, presented simultaneously. None of the samples is identified as the standard. Control and experimental treatments were systematically varied so that each was presented in odd and identical sample positions an equal number of times. The judge determined which of the three samples differed from the other two. A forced choice was required. Statistical analysis was used to determine whether a significant difference between treatments existed. The probability of choosing the different or odd sample by chance alone was one-third. Once the odd sample was chosen the judges were asked why the samples were different and which they preferred.

The starches tested were waxy maize starches adjusted to pH 9.5 and heat treated for 7 hours at 140° C. but one sample was dehydrated by ethanol extraction and the other sample was thermally dehydrated prior to the thermal inhibition step.

The thermally-inhibited starches were washed by slurring the granular starch with 1.5 parts water, mixing for 10 minutes on a stir plate, vacuum filtering the slurry, and washing the starch cake twice with 50 ml. of distilled water. Then sufficient water was added to bring the slurry solids to 3%, the pH was adjusted to 6.0–6.5, and the slurry was cooked 20 minutes in a boiling water bath, cooled to slightly above room temperature, and evaluated.

The judges were given 20 ml samples for tasting. They observed a significant difference between the oven-dehydrated and ethanol-dehydrated starches. Nine out of the twelve judges chose the one different sample. All nine of the judges who could determine the different sample preferred the sample that was ethanol-extracted. Attributes that were used to describe the ethanol-extracted sample included clean, not bitter, and smooth compared to the oven-dehydrated sample.

Example 16

This example shows that an alcohol extraction of a granular starch which is thermally-inhibited provides a better tasting starch.

A thermally-inhibited, granular waxy maize (adjusted to pH 9.5 and dehydrated and heat treated for 180 minutes in a fluidized bed at 160° C.) was placed in a Soxhlet extraction apparatus and allowed to reflux overnight (about 17 hrs) using ethanol as the solvent (bp-78° C.). The extracted starch was then laid on paper to allow excess ethanol to flash off. The resulting dry starch was washed by slurring the starch with 1.5 parts water, mixing for 10 minutes on a stir plate, vacuum filtering the slurry, and washing the starch cake twice with 50 ml of distilled water. Then sufficient water was added to bring the slurry solids to 3%, the pH was adjusted to 6.0–6.5, and the slurry was cooked in a boiling water bath for 20 minutes. The cook was cooled to slightly above room temperature and evaluated. The thermally-inhibited, non-ethanol-extracted base was used as the control.

The taste test performed was a "Paired-Preference Test". Two samples are presented, simultaneously or sequentially. The judge is requested to express a preference based on a specific attribute, here which sample is cleaner. Results are obtained in terms of relative frequencies of choice of the two samples as accumulated for all participants. Six of the eight trained judges identified the ethanol-extracted sample as having a blander, cleaner flavor with less aftertaste.

Example 17

This example shows that etherified starches can be thermally-inhibited by this process. Waxy maize samples treated with 7% and 3% by weight of propylene oxide (PO), at naturally occurring pH and at pH 9.5, were thermally dehydrated and heat treated in a fluidized bed, as described previously, and evaluated for inhibition.

The results are set out in the following tables.

|  | Viscosity (B.U.) | | | | Break-down (%) |
| --- | --- | --- | --- | --- | --- |
|  | Peak | Peak + 10 min | 92° C. | 92° C. + 30 min | |
| Waxy Maize (7% PO; natural pH) | | | | | |
| Control | 1420 | 395 | — | — | 72 |
| Time at 160° C. (min) | | | | | |
| 0 | 1030 | 380 | — | — | 63 |
| 30 | 800 | 530 | — | — | 34 |
| 60 | 685 | 430 | — | — | 37 |
| 90 | 635 | 340 | — | — | 46 |
| 120 | 620 | 340 | — | — | 45 |
| 150 | 565 | 300 | — | — | 47 |
| 180 | 540 | 280 | — | — | 48 |
| Waxy Maize (7% PO; pH 9.5) | | | | | |
| Time at 160° C. (min) | | | | | |
| 0 | 1360 | 960 | — | — | 29 |
| 30 | 1010 | 950 | — | — | 6 |
| 60 | 1030 | 930 | — | — | 10 |
| 90 | 910 | 890 | — | — | 2 |
| 120 | 843 | 830 | — | — | 2 |
| 180 | 800 | 792 | — | — | 1 |
| Waxy Maize (3% PO; Natural pH) | | | | | |
| Control | 1155 | 280 | — | — | 76 |
| Time at 160° C. (min) | | | | | |
| 0 | 900 | 360 | — | — | 60 |
| 30 | 570 | 370 | — | — | 35 |
| 60 | 480 | 350 | — | — | 27 |
| 90 | 440 | 300 | — | — | 32 |
| 120 | 375 | 235 | — | — | 37 |
| 150 | 310 | 185 | — | — | 40 |
| 180 | 300 | 180 | — | — | 40 |
| Waxy Maize (3% PO; pH 9.5) | | | | | |
| Time at 160° C. (min) | | | | | |
| 0 | 1220 | 960 | — | — | 21 |
| 30 | 1020 | 950 | — | — | 7 |
| 60 | 880 | 865 | — | — | 2 |
| 90 | — | — | 750 | 790 | — |
| 120 | — | — | 620 | 780 | — |
| 150 | — | — | 510 | 750 | — |
| 180 | — | — | 400 | 700 | — |

The data show that etherified waxy maize can be thermally inhibited by this process and that higher inhibition can be achieved at higher pH.

Example 18

This example shows that esterified starches can be thermally inhibited by this process. Waxy maize samples at naturally occurring pH and at pH 8.5 were acetylated by reacting with 1% by weight of acetic anhydride and thermally dehydrated and heat treated in the fluidized bed as previously described.

The results of the inhibition are shown below.

|  | Viscosity (B.U.) | | | | Break-down (%) |
| --- | --- | --- | --- | --- | --- |
|  | Peak | Peak + 10 min | 92° C. | 92° C. + 30 min | |
| Waxy Maize (1% Acetic Anhydride; Natural pH) | | | | | |
| Control | 1480 | 490 | — | — | 67 |
| Time at 160° C. (min) | | | | | |
| 0 | 1030 | 570 | — | — | 45 |
| 30 | 880 | 650 | — | — | 26 |
| 60 | 720 | 510 | — | — | 29 |
| 120 | 605 | 490 | — | — | 19 |
| 180 | 545 | 460 | — | — | 16 |
| Waxy Maize (1% Acetic Anhydride; pH 8.5) | | | | | |
| Time at 160° C. (min) | | | | | |
| 0 | 1170 | 560 | — | — | 52 |
| 30 | 970 | 725 | — | — | 25 |
| 60 | 875 | 600 | — | — | 31 |
| 120 | 690 | 490 | — | — | 29 |
| 180 | 585 | 545 | — | — | 7 |

The data show that acetylated waxy maize can be inhibited to varying degrees and that higher inhibition can be obtained at higher pH.

Example 19

Waxy maize samples at naturally occurring pH and at pH 9.5 were crosslinked with phosphorous oxychloride ($POCl_3$) at 0.02% by weight. They were thermally inhibited and heat treated in the fluidized bed, as previously described, and were evaluated for inhibition.

The results set out in the following tables.

|  | Viscosity (B.U.) | | | | Break-down (%) |
| --- | --- | --- | --- | --- | --- |
|  | Peak | Peak + 10 min | 92° C. | 92° C. + 30 min | |
| Waxy Maize (0.02% $POCl_3$; Natural pH) | | | | | |
| Control | 830 | 820 | — | — | — |
| Time at 160° C. (min) | | | | | |
| 0 | 750 | 742 | 730 | 720 | 1 |
| 30 | 635 | 522 | 630 | 580 | 2 |
| 60 | 550 | 525 | 550 | 465 | 5 |
| 90 | 425 | 415 | 420 | 360 | 2 |
| 120 | 335 | 315 | 330 | 280 | 6 |
| 150 | 280 | 260 | 280 | 210 | 7 |
| 180 | 205 | 200 | 200 | 180 | 2 |
| Waxy Maize (0.02% $POCl_3$; pH 9.5) | | | | | |
| Time at 160° C. (min) | | | | | |
| 0 | 750 | 720 | — | — | 4 |

-continued

| | Viscosity (B.U.) | | | | Breakdown (%) |
|---|---|---|---|---|---|
| | Peak | Peak + 10 min | 92° C. | 92° C. + 30 min | |
| 30 | — | — | 630 | 660 | — |
| 60 | — | — | 400 | 635 | — |
| 90 | — | — | 330 | 520 | — |
| 120 | — | — | 180 | 530 | — |
| 150 | — | — | 110 | 470 | — |
| 180 | — | — | 100 | 470 | — |

The data shows decreasing viscosity and almost no breakdown in viscosity with longer heat treating times, indicating that crosslinked starches can be made even more inhibited by this process. The data also shows that increasing the pH further increases inhibition.

Example 20

This example shows the use of thermally-inhibited (thermally dehydrated and heat treated) waxy maize starches and tapioca starches in retorted high acid (pH <3.7) and acid (pH 3.7–4.5) foods.

Part A

Cherry Pie Filling

The filling was prepared using the ingredients listed below.

| Ingredient | Waxy Maize | T-I Waxy Maize[1] (160° C./ 150 min) | T-I Waxy Maize[2] (160° C./ 60 min) |
|---|---|---|---|
| Cherry Juice | 31.90 | 31.90 | 31.90 |
| Salt | 0.10 | 0.10 | 0.10 |
| Waxy Maize | 2.80 | — | — |
| T-I Waxy Maize[1] (pH 9.5; 160° C./150 min) | — | 2.80 | — |
| T-1 Waxy Maize[2] (pH 9.5; 160° C./60 min) | — | — | 2.80 |
| Water | 7.40 | 7.40 | 7.40 |
| Granulated Sugar | 9.20 | 9.20 | 9.20 |
| Lemon Juice | 0.50 | 0.50 | 0.50 |
| Sodium Benzoate | 0.05 | 0.05 | 0.05 |
| Cherries (5:1 cherries:sugar ratio) | 48.00 | 48.00 | 48.00 |
| Total | 100.00% | 100.00% | 100.00% |

[1]The starch cook had no peak viscosity as the Brabender curve was still rising.
[2]The starch cook had a peak viscosity of 695 B.U., 10 minutes after peak viscosity of 685 B.U., and a viscosity breakdown of 1.4%.

The cherry juice and salt were brought to 82° C. (180° F.) in a steam-jacketed kettle. A smooth aqueous suspension of the starch was added slowly with constant agitation. The mixture was cooked to 85–88° C. (185–190° F.). A well blended mixture of all the remaining ingredients except the cherries was added and dissolved thoroughly. The cherries were mixed in and the temperature was brought back to 82–85° C. (180–185° F.). The mixture was poured into #1 (10 oz) cans and steam retorted until an internal can temperature of 93° C. (200° F.) was achieved.

The results of the pie filling evaluations are tabulated below:

| Starch | pH Of Filling | Subjective Evaluation | Bostwick Viscosity[1] (Room Temp.) | Bostwick Viscosity[2] (350° F. For 40 Min.) |
|---|---|---|---|---|
| Waxy Maize | 3.5 | cohesive, long, thin not acceptable | 12.3 | 13.0 |
| T-I Waxy Maize (pH 9.5; 160° C./ 150 min) | 3.4 | thick, slightly coarse | 4.3 | 4.7 |
| T-I Waxy Maize (pH 9.5; 160° C./ 60 min) | 3.5 | thick, short, smooth | 2.1 | 3.6 |

[1]Bostwick Consistometer measures the filling flow in centimeters. The lower the number, the higher the viscosity. The values are taken at 60 seconds.
[2]Values for the baked filling.

The results show that the thermally-inhibited starches were superior in texture (e.g., non-cohesive) compared to the unmodified waxy maize control. Viscosity values indicate that the filling prepared with the thermally-inhibited starches was significantly heavier both after retorting and baking compared to the unmodified waxy maize control. The thermally-inhibited starches have excellent acid and heat stability and work well in a high acid food system.

Part B

Apricot Baby Food

The baby food was prepared using the following ingredients:

| Ingredient | Tapioca | T-I Tapioca (160° C./ 30 min) | T-I Tapioca (160° C./ 90 min) |
|---|---|---|---|
| Distilled Water | 56.3 | 56.3 | 56.3 |
| Sugar | 7.5 | 7.5 | 7.5 |
| Corn Syrup | 5.0 | 5.0 | 5.0 |
| Apricot Puree | 26.7 | 26.7 | 26.7 |
| Tapioca Starch | 4.5 | — | — |
| T-I Tapioca Starch[1] (pH 9.5; 160° C./ 30 min) | — | 4.5 | — |

[1]Measured using the Brookfield Viscometer (Model RVT, spindle #5 at 20 rpm).

The thermally-inhibited tapioca, especially the more inhibited product (90 minutes at 160° C.) was very good from a viscosity and texture standpoint. It also had excellent stability to heat and the acidic pH. Unmodified tapioca was unacceptable, i.e., low in viscosity with a cohesive texture.

Example 21

This example shows the preparation of a beef gravy, a "low acid" food having a pH of 5.0–5.2, using thermally-inhibited (thermally dehydrated and heat treated) waxy maize starches.

| Ingredients | Waxy Maize Control | T-I Waxy Maize (160° C./ 30 min) | T-I Waxy Maize (160° C./ 60 min) | T-I Waxy Maize (160° C./ 180 min) |
|---|---|---|---|---|
| Beef Broth | 63.00 | 63.00 | 63.00 | 63.00 |
| Water | 13.00 | 13.00 | 13.00 | 13.00 |
| Salt | 0.40 | 0.40 | 0.40 | 0.40 |
| Onion Powder | 0.25 | 0.25 | 0.25 | 0.25 |
| Waxy Maize | 4.50 | — | — | — |
| T-I Waxy Maize[1] (pH 9.5; 160° C./ 30 min) | — | 4.50 | — | — |
| T-I Waxy Maize[2] (pH 9.5; 160° C./ 60 min) | — | — | 4.50 | — |
| T-I Waxy Maize[3] (pH 9.5; 160° C./ 180 min) | — | — | — | 4.50 |
| Wheat Flour | 0.50 | 0.50 | 0.50 | 0.50 |
| Titanium Dioxide | 0.03 | 0.03 | 0.03 | 0.03 |
| Water | 10.80 | 10.80 | 10.80 | 10.80 |
| Vegetable Shortening | 6.00 | 6.00 | 6.00 | 6.00 |
| Beef Flavor | 1.00 | 1.00 | 1.00 | 1.00 |
| Paprika | 0.25 | 0.25 | 0.25 | 0.25 |
| Worchester-shire Sauce | 0.25 | 0.25 | 0.25 | 0.25 |
| Caramel Color | 0.02 | 0.02 | 0.02 | 0.02 |
| Total | 100.00% | 100.00% | 100.00% | 100.00% |

[1]The starch cook had a peak viscosity of 760 B.U., 10 minutes after peak viscosity of 740 B.U., and breakdown of 3%.
[2]The starch cook had a peak viscosity of 795 B.U., 10 minutes after peak viscosity of 790 B.U., and breakdown of 1%.
[3]The starch cook had no peak viscosity as the curve was still rising.

The beef broth, water, salt, and onion powder were preblended. The starch, wheat flour, titanium dioxide, and water were mixed, heated to 88–90.5° C. (190–195° F.), and added to a mixture of the shortening, beef flavor, paprika, Worcestershire sauce, and caramel color. The mixture was poured into #1 (10 oz.) cans and steam retorted to an internal can temperature of at least 118° C. (245° F.) and held for 10 min.

The cans were opened and the product was cooked in a sauce pan to a serving temperature of 50° C. (122° F.). The gravy evaluation results and Brookfield viscosities are shown below.

| Starch | Subjective Evaluation[1] | Viscosity[2] (cps) |
|---|---|---|
| Waxy Maize | water thin, broken down | 500 |
| T-I Waxy Maize (pH 9.5; 160° C./ 30 min) | smooth, creamy, slightly cohesive | 4300 |
| T-I Waxy Maize (pH 9.5; 160° C./ 60 min) | thick, heavy, pourable, short | 6200 |
| T-I Waxy Maize (pH 9.5; 160° C./ 180 min) | thick, smooth, short, non-cohesive | 7900 |

| Starch | Subjective Evaluation After Cooking (50° C.) | Viscosity (cps) |
|---|---|---|
| Waxy Maize | water thin, worse than RT sample | 225 |
| T-I Waxy Maize (pH 9.5; 160° C./ 30 min) | smooth, creamy, not as cohesive as RT | 2700 |
| T-I Waxy Maize (pH 9.5; 160° C./ 60 min) | thick, smooth, non-cohesive, short | 4150 |
| T-I Waxy Maize (pH 9.5; 160° C./ 180 min) | heavy, smooth, short, non-cohesive | 5400 |

[1]The retorted products were evaluated 24 hours after canning at room temperature (RT).
[2]Measured with a Brookfield Viscometer (Model RVT, spindles #5 and #3 at 20 rpm).

The key requirements for the starches used in this application are texture and heat stability, i.e., resistance to viscosity breakdown during high temperature retorting. The thermally-inhibited waxy maize starches showed good functionality. The starch inhibited for 180 minutes at 160° C. performed the best. Native waxy maize did not hold up under these processing conditions and is not acceptable for this application.

Example 22

This example shows the use of thermally-inhibited (thermally dehydrated and heat treated) waxy maize and tapioca starches in yogurt.

| Ingredients | #1 | #2 | #3 | #4 | #5 |
|---|---|---|---|---|---|
| 1% Lowfat Milk | 90.0 | 90.0 | 90.0 | 90.0 | 93.75 |
| Nonfat Milk | 6.0 | 6.0 | 6.0 | 6.0 | 6.25 |
| 10 DE Maltodextrin | 2.0 | 2.0 | 2.0 | 2.0 | — |
| T-I Tapioca[1] (pH 9.5; 160°/ 75 min) | 2.0 | — | — | — | — |
| T-I Tapioca[2] (pH 9.5; 160°/ 105 min) | — | 2.0 | — | — | — |
| T-I Waxy Maize[3] (pH 9.5; 160°/ 60 min.) | — | — | 2.0 | — | — |

-continued

| Ingredients | #1 | #2 | #3 | #4 | #5 |
|---|---|---|---|---|---|
| T-I Waxy Maize[4] (pH 9.5; 160°/120 min) | — | — | — | 2.0 | — |
| Blank (No Starch) | — | — | — | — | — |
| Total | 100.0% | 100.0% | 100.0% | 100.0% | 100.0% |

[1]The starch cook had a peak viscosity of 685 B.U., 10 minutes after peak viscosity of 660 B.U., and breakdown of 3.6%.
[2]The starch cook had a peak viscosity of 525 B.U., 10 minutes after peak viscosity of 520 B.U., and breakdown of 1%.
[3]The starch cook had a peak viscosity of 665 B.U., 10 minutes after peak viscosity of 655 B.U., and breakdown of 1.5%.
[4]The starch cook had no peak viscosity as the curve was still rising.

All the dry ingredients were blended together and added to the milk. The mixture was blended using a Waring blender for 1 minute at 30 rpm, transferred to an aluminum container, pasteurized in a steam bath at 82° C. (180° F.) for 10 minutes and homogenized hot at 1500 psi, and cooled to 45.5° C. (114° F.). The yogurt starter culture was then added. The mixture was incubated at 45° C. (113° F.) until a pH of 4.2–4.5 was reached. The finished product was stored in the refrigerator and evaluated after 24 hours and 2 and 5 weeks for cuttability (a rating of 5 indicates the most cuttable; a positive attribute), syneresis (i.e., visible water separation on surface; a negative attribute), and viscosity.

| Evaluation | #1 | #2 | #3 | #4 | #5 |
|---|---|---|---|---|---|
| Cuttability after 24 hours | 5 | 5 | 3 | 4 | 3 |
| Cuttability after 2 weeks | 5 | 5 | 3 | 4 | 4 |
| Syneresis after 2 weeks | none | none | none | none | yes |
| Viscosity after 2 weeks | 24,000 | 28,000 | 13,000 | 20,000 | 10,000 |
| Syneresis after 5 weeks | none | none | none | none | yes |
| Viscosity after 5 weeks | 30,000 | 31,000 | 19,000 | 23,000 | 16,000 |

The yogurt containing the thermally-inhibited tapioca starches had the best cuttability and highest viscosity. Both the thermally-inhibited tapioca and waxy maize starches controlled syneresis. The thermally-inhibited tapioca heat-treated at 160° C. for 75 minutes (#1) and the thermally-inhibited waxy maize heat-treated at 160° C. for 120 minutes (#4) were best. Of these, the less inhibited tapioca starch (75 minute heat treatment at 160° C.) was preferred.

Example 23

This example shows the use of thermally-inhibited (thermally dehydrated heat treated) potato starches in a hot dog (i.e., an emulsified meat).

| Ingredients | Potato | T-I Potato[3] | T-I Potato[4] | No Starch |
|---|---|---|---|---|
| Beef (80's)[1] | 34.20 | 34.20 | 34.20 | 34.20 |
| Pork (50's)[2] | 34.20 | 34.20 | 34.20 | 34.20 |
| Ice/water | 23.92 | 23.92 | 23.92 | 23.92 |
| Native Potato | 3.50 | — | — | — |
| T-I Potato[3] (pH 9.5; 160° C./60 min) | — | 3.50 | — | — |
| T-I Potato[4] (pH 9.5; 160° C./150 min) | — | — | 3.50 | — |
| No Starch | — | — | — | — |
| Salt | 2.00 | 2.00 | 2.00 | 2.00 |
| Dextrose | 0.96 | 0.96 | 0.96 | 0.96 |
| Spice Blend | 0.68 | 0.68 | 0.68 | 0.68 |
| Sodium Phosphate | 0.34 | 0.34 | 0.34 | 0.34 |
| Curing Mixture[5] | 0.17 | 0.17 | 0.17 | 0.17 |
| Erythorbate | 0.03 | 0.03 | 0.03 | 0.03 |
| Total | 100.00% | 100.0% | 100.00% | 100.00% |

[1]80% lean/20% fat.
[2]50% lean/50% fat.
[3]The starch cook had a peak viscosity of 930 B.U., a 10 minutes after peak viscosity of 985 B.U., and 2.7% breakdown.
[4]The starch cook had no peak viscosity as the curve was still rising.
[5]The curing mixture is a combination of sodium nitrate (6.25%) and sodium chloride (93.75%).

The meat was coarsely ground in a bowl chopper at <5.5° C. (<42° F.). The salt and half the ice were added and chopped. The curing mixture, phosphate, and erythorbate were separately added and chopped in after each addition. The seasoning and starch were added and chopped. The mixture was chopped until the temperature rose to 5.5° C. (42° F.). The remainder of the ice was added and the mixture was chopped until 17° C. (62° F.) was reached. The chopped meat mixture was stuffed into synthetic casings and smoked until the internal temperature reached 71° C. (160° F.).

The yield, measured as weight after smoking divided by weight before smoking times 100, and moisture content are shown below. Moisture retention is one of the key factors which controls the product quality. Starch tends to help control moisture and potato starch is routinely used as a means to control moisture in meat products.

| Sample | Yield (%) | Moisture Lost (%) |
|---|---|---|
| No Starch | 71.03 | 28.97 |
| Potato Starch | 75.90 | 24.10 |
| T-I Potato Starch (pH 9.5; 160° C./60 min) | 87.73 | 12.27 |
| T-I Potato Starch (pH 9.5; 160° C./150 min) | 86.09 | 13.91 |

The use of the thermally-inhibited potato starches provided higher yields, i.e., better moisture retention, compared to both the unmodified potato starch and the "no starch" control.

Example 24

This example shows the use of thermally-inhibited (thermally dehydrated and heat treated) high amylose corn starches (70% amylose) in a batter for French fries. A native high amylose corn starch was used as a control.

The batter dry mix ingredients are shown below:

| Ingredient | % | | | |
|---|---|---|---|---|
| Wheat Flour | 54.8 | 54.8 | 54.8 | 54.8 |
| Blend of ⅔ Starch High Amylose Corn and ⅓ Tapioca Dextrin | 10.0 | 10.0 | 10.0 | 10.0 |
| Salt | 10.0 | 10.0 | 10.0 | 10.0 |
| Acetylated High Amylose Corn Starch (50% amylose; 5% reagent) | 9.0 | 9.0 | 9.0 | 9.0 |
| Rice Flour | 6.0 | 6.0 | 6.0 | 6.0 |
| High Amylose Corn Starch | 5.0 | — | — | — |
| T-I High Amylose Corn Starch (pH 9.5; 160° C./0 min) | — | 5.0 | — | — |
| T-I High Amylose Corn Starch (pH 9.5; 160° C./60 min) | — | — | 5.0 | — |
| T-I High Amylose Corn Starch (pH 9.5; 160° C./120 min) | — | — | — | 5.0 |
| Sucrose | 5.0 | 5.0 | 5.0 | 5.0 |
| Guar Gum 4500F | 0.2 | 0.2 | 0.2 | 0.2 |
| Total | 100.0 | 100.0 | 100.0 | 100.0 |

A total of 200 ml. of water was added to 100 g. of the dry mix. The mixture was stirred until uniformly mixed. Potatoes were dipped into the batter and drained for 10 seconds. The potatoes were then fried at 182–188° C. (360–370° F.) for 2 minutes and 20 seconds and held for 15 minutes under a heat lamp before evaluation.

| | Pick-up | Color | Texture | Crispness |
|---|---|---|---|---|
| High Amylose Corn | 8.53% | golden brown | flexible, tender | 6.0 |
| T-I High Amylose Corn (pH 9.5; 160° C./0 min) | 9.72% | dull, grey-brown | little crunchier | 7.0 |
| T-I High Amylose Corn (pH 9.5; 160° C./60 min) | 7.97% | less golden | crispier | 6.5 |
| T-I High Amylose Corn (pH 9.5; 160° C./120 min) | 9.32% | slightly less golden | crispier | 7.0 |

The thermally-inhibited starches provided more crispness than the high amylose control. Batter pick-up was reasonably similar for all products in comparison to the control.

Example 25

This example shows use of thermally-inhibited (thermally dehydrated and heat treated) waxy rice starches in a retorted white sauce.

A white sauce was prepared from the formulation set forth below by (1) blending the dry ingredients and adding them to the milk and water using a no-shear Baldor Mixer (a Lightin' Mixer type unit); (2) heating the mixture to 80° C. (176° F.); (3) adding the liquid margarine and blending for 15 minutes; and (4) filling 10 ounce cans with the mixture and heat processing the canned sauce to an internal can temperature of 121° C. (250° F.) and a minimum Fo of 5 in a pilot scale, full water immersion Stock 900 retort.

White Sauce Formulation

| Ingredient | % |
|---|---|
| Whole Milk | 45.74 |
| Water | 45.73 |
| Liquid Margarine | 5.00 |
| Starch | 2.20 |
| Salt | 0.73 |
| Wheat Flour | 0.50 |
| White Pepper | 0.05 |
| Nutmeg | 0.05 |
| Total | 100.00 |

The starches utilized in the formulation are described below. The waxy rice starches had an initial moisture content of 10.6%. Viscosity readings were taken prior to filling the cans and after retorting using a Brookfield RVT Viscometer with a #4 spindle at 10 rpm. The final products were also evaluated for organoleptic quality and subjectively rated from 1–10 (10 is best).

The results are shown below:

Heat-Treated Waxy Rice Starch in Retorted White Sauce

| Starch | Hot Fill Viscosity (cps) | Viscosity After Retorting (cps) | Description | Relative Rank |
|---|---|---|---|---|
| T-I Waxy Rice Starch (pH 8.5; 160° C.:/ 30 min) | 200 | 1600 | slightly thin, no lumps, slightly grainy | 8.5 |
| T-I Waxy Rice Starch (pH 8.5; 160° C.:/ 60 min) | 600 | 2800 | smooth, no lumps, creamy | 9.0 |
| T-I Waxy Rice Starch (pH 8.5; 160° C.:/ 120 min) | — | 2000 | slightly thin, a few lumps, slightly grainy | 8.5 |
| (Control) Waxy Rice Starch | 500 | 2400 | very slightly grainy, slightly thin | 8.0 |

The thermally-inhibited waxy rice starches thickened the sauce throughout processing, thus controlling margarine separation, gave excellent texture, and were comparable in quality to, or better than, commercial starches typically used in retorted white sauces.

Example 26

This example show the use of thermally-inhibited (thermally dehydrated and heat treated) waxy maize and tapioca starches in "Ramen-type" instant noodles.

| Ingredients | Waxy Maize | T-I Waxy Maize[1] | T-I Waxy Maize[2] |
|---|---|---|---|
| Wheat Flour (10% Protein) | 62.99 | 62.99 | 62.99 |
| Waxy Maize | 10.0 | — | — |
| T-I Waxy Maize[1] (pH 9.5; 160° C./30 min) | — | 10.0 | — |
| T-I Waxy Maize[2] (pH 9.5; 160° C./60 min) | — | — | 10.0 |
| Tapioca | — | — | — |
| Salt | 8.0 | 8.0 | 8.0 |
| Kansui Powder | 0.20 | 0.20 | 0.20 |
| Carboxy-methyl celluose (CMC) | 0.01 | 0.01 | 0.01 |
| Water | 26.00 | 26.00 | 26.00 |
| Total | 100.00 | 100.00 | 100.00 |

| Ingredients | Tapioca | T-I Tapioca[3] | T-I Tapioca[4] |
|---|---|---|---|
| Wheat Flour (10% Protein) | 62.99 | 62.99 | 62.99 |
| Tapioca | 10.0 | — | — |
| T-I Tapioca[3] (pH 9.5; 160° C./45 min) | — | 10.0 | — |
| T-I Tapioca[4] (pH 9.5; 160° C./75 min) | — | — | 10.0 |
| Salt | 8.0 | 8.0 | 8.0 |
| Kansui Powder | 0.20 | 0.20 | 0.20 |
| Carboxy methyl-celluose (CMC) | 0.01 | 0.01 | 0.01 |
| Water | 26.00 | 26.00 | 26.00 |
| Total | 100.00 | 100.00 | 100.00 |

[1]The starch cook had a peak viscosity of 760 B.U., 10 minutes after peak viscosity of 740 B.U., and 2.6% breakdown.
[2]The starch cook had a peak viscosity of 695 B.U., 10 minutes after peak viscosity of 690 B.U., and 0.7% breakdown.
[3]The starch cook had a peak viscosity of 915 B.U., 10 minutes after peak viscosity of 810 B.U., and breakdown of 11.5%.
[4]The starch cook had a peak viscosity of 685 B.U., 10 minutes after peak viscosity of 660 B.U., and breakdown of 3.6%.

The flour was placed in a Hobart mixer and mixed at low speed (#1 setting) for 3 min. The Kansui powder (a 57/30/13 w/w mixture of sodium carbonate, potassium carbonate, and sodium polyphosphate) and salt were dissolved in half the amount of water. The CMC was dissolved in the remaining water and allowed to hydrate for at least 30 min. The two solutions were mixed, then added to the flour, and mixed at low speed for 3 minutes. The mixing speed was increased to medium (#2 setting) and held for 6 minutes. The mixture was added to the feed tray of the sheeting machine and passed through the rollers with the clearance set at 2 mm. The clearance was adjusted to 3 mm and the sheet was folded and passed through the rollers. This step was repeated two additional times. The thickness of the sheet was then reduced by decreasing the roller gap with each pass (e.g., 3 mm→2 mm→1.4 mm→1 mm→0.8 mm gap). The 0.8 mm sheet was cut into noodles. The noodles were compressed into weaves when they exited from the chute.. The noodles were transferred to the steaming trays which were placed in the steamer and the noodles were steamed for 1 minute. After steaming, the noodles were air-dried with a fan for 4 minutes, cut into portions, folded and placed onto trays which were placed into hot frying oil 150° C. (302° F.) for 1 minute. After frying, the noodle cakes were allowed to cool before packing. The noodles were cooked in boiling water for 3 minutes, removed, drained, and evaluated for their textural properties. Preferred textural attributes are increased firmness and elasticity in the bite.

The subjective taste test evaluations (10 extremely good, 1 extremely poor) are shown below.

| Cooked Noodles | Firmness | Elasticity |
|---|---|---|
| Waxy Maize | 3.5 | 3.5 |
| T-I Waxy Maize (pH 9.5; 160° C./30 min) | 6.0 | 5.0 |
| T-I Waxy Maize (pH 9.5; 160° C./60 min) | 6.0 | 6.0 |
| Tapioca | 5.0 | 5.0 |
| T-I Tapioca (pH 9.5; 160° C./45 min) | 5.5 | 7.0 |
| T-I Tapioca (pH 9.5; 160° C./75 min) | 6.0 | 5.5 |

The noodles containing the thermally-inhibited starches performed better than the unmodified native starches with respect to firmness and elasticity. The noodles containing the native starches tended to be more sticky, particularly the waxy maize, and were also softer in texture and had a poorer bite.

Example 27

This example shows the use of thermally-inhibited (thermally dehydrated and heat treated) waxy maize and potato starches in cereal. The ingredients are shown below.

| Ingredients | No Starch | Waxy Maize | T-I Waxy Maize[1] | Potato | T-I Potato[2] |
|---|---|---|---|---|---|
| Oat Flour | 70.0 | 70.0 | 70.0 | 70.0 | 70.0 |
| Corn Flour | 20.0 | 5.0 | 5.0 | 5.0 | 5.0 |
| Sugar | 10.0 | 10.0 | 10.0 | 10.0 | 10.0 |
| Waxy Maize | — | 15.0 | — | — | — |
| T-I Waxy Maize[1] (pH 9.5; 160° C./30 min) | — | — | 15.0 | — | — |
| Potato | — | — | — | 15.0 | — |
| T-I Potato[2] (pH 9.5; 160° C./90 min) | — | — | — | — | 15.0 |
| Total (%) | 100.0 | 100.0 | 100.0 | 100.0 | 100.0 |

[1]The starch cook had a peak viscosity of 845 B.U., 10 minutes after peak viscosity 780 B.U., and breakdown of 7.7%.
[2]The starch cook had a peak viscosity of 630 B.U., 10 minutes after peak viscosity 605 B.U., and breakdown of 2.7%.

The blended ingredients were fed into a twin-screw extruder (Werner & Pfleiderer, Model ZSK-30), and extruded using the following conditions:

| | |
|---|---|
| Barrel Length: | 7 (Length/Diameter = 21) |
| Screw Configuration: | Medium Shear Screw Design[1] |

| | |
|---|---|
| Screw Speed: | 350 rpm |
| Die Diameter: | 1 × 3 mm |
| Dry Feed Rate: | 13 kg/hr |
| Total % Moisture | 17% |
| Zone Temperatures | off/off/60/150/140° C. |

[1]A screw profile consisting of conveying, mixing, and reverse flight elements.

Samples were taken in the form of extrudate ropes. After steady state conditions were obtained, the ropes were cut into pieces approximately ¼ inch long. The samples were then placed on an aluminum baking tray and toasted at 200° C. (392° F.) for a period of 3–5 minutes.

The cereals were evaluated for expansion and bulk density. Using a set of digital micrometers, diameter readings were taken on 10 samples and the average diameter was determined. Using an Ohaus Triple Beam Balance, bulk density was determined for each sample. The beaker portion was filled to capacity, leveled off (without compacting any extrudate), and weighed. The results are shown below.

| Starch | Expansion (in.) | Expansion Change vs. Control (%) | Bulk Density (lbs/ft³) |
|---|---|---|---|
| None | 0.349 | — | 8.938 |
| Waxy Maize | 0.386 | 10.60 | 6.610 |
| T-I Waxy (pH 9.5; 160° C./ 30 min) | 0.404 | 15.75 | 6.748 |
| Potato | 0.350 | 0.28 | 8.213 |
| T-I Potato (pH 9.5; 160° C./ 90 min) | 0.385 | 10.30 | 7.418 |

In all cases, when the thermally-inhibited starches were used, cereal expansion was improved even further over the respective native starch bases. The thermally-inhibited starches were comparable to, if not superior to, their respective native bases in regard to cell size as related to bulk density (the lower the bulk density, the larger the cell size).

Example 28

Frozen Dessert

This example shows the use of thermally-inhibited (thermally dehydrated and heat treated) tapioca starches as a fat replacer in a typical frozen dessert ("ice cream"). The final product was smooth, clean in flavor, and had an enhanced mouthfeel.

The ingredients are shown below.

| Ingredients | #1 | #2 |
|---|---|---|
| Skim Milk | 75.25 | 75.25 |
| Non Fat Dry Milk | 5.95 | 5.95 |
| Sugar | 10.00 | 10.00 |
| Sherex-302 | 0.80 | 0.80 |
| 36 D.E. Corn Syrup | 6.00 | 6.00 |
| T-I Tapioca[1] (pH 9.5; 160° C./75 min) | 2.00 | — |
| T-I Tapioca[2] (pH 9.5; 160° C./105 min) | — | 2.00 |
| Total | 100.00 | 100.00 |

[1]The starch cook had a peak viscosity of 685 B.U., 10 minutes after peak viscosity of 660 B.U., and 3.6% breakdown.
[2]The starch cook had a peak viscosity of 525 B.U., 10 minutes after peak viscosity of 520 B.U., and 1% breakdown.

Sherex-302 was added to the milk in a Waring blender and mixed for 1–2 minutes. Corn syrup was added to the mixture. The sugar and starch were dry blended and added to the mixture and thoroughly mixed for one minute. The mixture was pasteurized under agitation at 71° C. (160° F.) for 30 minutes. It was homogenized at 1000/500 psi in a two stage Gaulin homogenizer, cooled to 4.5° C. (40° F.), aged for 24 hours, and frozen.

The viscosity of the mixture was determined initially by measuring the time it took for 25 grams of mix to flow through a #2 Zahn cup. The mix was then held for 1 week in a refrigerator at about 4.5° C. (40° F.). The desserts were taste-tested for mouth-feel enhancement, flavor and texture and the viscosity was measured as described above.

The results are shown below.

| Starch | Initial Viscosity | 1 Week Viscosity | Texture |
|---|---|---|---|
| T-I Tapioca (pH 9.5; 160° C./ 75 min) | 67 seconds | 68 seconds | smooth, clean flavor, long meltaway, slippery |
| T-I Tapioca (pH 9.5; 160° C./ 105 min) | 29 seconds | 37 seconds | very cold, quick meltaway, smooth, firm and heavy in the mouth |

The results show that tapioca thermally-inhibited at 160° C. for 75 minutes performed well as a fat replacer in a soft serve frozen dessert. The product had a smooth texture, clean flavor and was slippery in the mouth. In addition, the viscosity of the mixture was stable over time. The thermally-inhibited tapioca 160° C./105 minute sample was also acceptable. The product, however, was heavy in mouth-coating, had a quick meltaway, and the viscosity of the mixture was slightly unstable over time. Within one week, the mix viscosity increased from 29 seconds to 37 seconds. Based on microscopic evaluation, it is believed that the starch was undercooked. The pasteurization of this dessert will require a temperature above 71° C. (160° F.) in order to have an adequate starch cook.

Example 29

This example shows the use of pregelatinized thermally-inhibited (thermally dehydrated and heat treated) granular waxy maize starches in an instant chocolate pudding. All of starches were adjusted to pH and pregelatinized using the procedure described earlier for preparing granular pregelatinized starches.

The ingredients are set out below.

| Ingredients | #1 % | #2 % | #3 % |
| --- | --- | --- | --- |
| Sugar | 51.22 | 51.22 | 51.22 |
| Dextrose | 18.00 | 18.00 | 18.00 |
| Pregelatinized Granular Waxy Maize (pH 10) | 15.30 | — | — |
| T-I Pregelatinized Granular Waxy Maize (pH 10; 140° C./0 min) | — | 15.30 | — |
| T-I Pregelatinized Granular Waxy Maize (pH 10; 160° C./0 min) | — | — | 15.30 |
| Cocoa (Dezaan) | 7.50 | 7.50 | 7.50 |
| Tetrasodium Pyrophosphate | 2.40 | 2.40 | 2.40 |
| Caramel Color | 2.00 | 2.00 | 2.00 |
| Disodium Phosphate | 1.20 | 1.20 | 1.20 |
| Vegetable Oil | 0.80 | 0.80 | 0.80 |
| Myvacet 9-45 | 0.50 | 0.50 | 0.50 |
| Salt | 0.50 | 0.50 | 0.50 |
| Chocolate Flavor | 0.30 | 0.30 | 0.30 |
| Vanilla Flavor | 0.20 | 0.20 | 0.20 |
| Brown Color | 0.08 | 0.08 | 0.08 |
| Total | 100.00 | 100.00 | 100.00 |

The Myvacet 9-45 and the vegetable oil were preblended with a portion of the sugar. All the remaining ingredients were thoroughly dry blended and ground in a coffee grinder. One part of the dry mix was added to 3.51 parts of cold milk, mixed for 2 minutes on medium speed, and refrigerated to set.

The evaluations are shown below.

| | Instant Chocolate Pudding Evaluation | | |
| --- | --- | --- | --- |
| | Texture | Taste | Brookfield Viscosity (cps) |
| #1 | smooth, soft, cohesive | quick meltdown, smooth, | 20,000 |
| #2 | short, cuttable, non-cohesive | quick meltdown, smooth, | 16,000 |
| #3 | short, cuttable, non-cohesive | quick melt, smooth, | 13,200 |

The texture of the puddings containing the thermally-inhibited starches was less gummy and had a smoother, creamier mouthful compared to the waxy maize control which possessed an undesirable cohesive texture.

Example 30

This example illustrates the use of a derivatized, thermally-inhibited (thermally dehydrated and heat treated) waxy maize starch as a "fill viscosity" starch for thermally-processed (e.g., retorted or UHT-processed) products. "Fill viscosity" starch is an art-recognized term which refers to a starch which has adequate viscosity during the "kettle-cooking" stage of the canning operation but which is retort-degradable, thus providing little viscosity to the final product. The starch used was derivatized with 7% propylene oxide (PO) prior to the thermal inhibition process (pH 9.5; 160° C./0 min).

Part A

Viscoamylography Analysis of T-I Starch

Using a pressurized VISCO/Amylo/GRAPH (C. W. Brabender) to simulate a canning process where the product is first "kettle-cooked" and then "retorted", a suspension (5% solids; neutral pH of 6.5) of the hydroxypropylated, thermally-inhibited starch (pH 9.5; 160° C./0 min) was cooked under the following conditions: the suspension was heated to 85° C. (185° F.), held for approximately 20 minutes, then heated to 121° C. (250° F.), and held for another 20 minutes prior to cooling. The first heating phase (i.e., the 85° C. and 20 minute hold) simulates the "kettle-cook", while the second high temperature phase (i.e., the 121° C. and 20 minute hold) simulates "retort" conditions. The viscosity profile of these starches is shown in FIG. 1.

The hydroxypropylated, thermally-inhibited starch provided substantial viscosity at the "kettle-cook" temperature of about 85° C., but broke down in viscosity at the "retort" temperature of about 121° C. See FIG. 1. The thermally-inhibited starch had a higher viscosity and more sustained heat tolerance at 85° C. than the unmodified waxy maize control. Upon retorting, however, the thermally-inhibited starch broke down to nearly the same viscosity as the waxy maize control. Since the thermally-inhibited starch was consistently higher in viscosity throughout the entire operation, a lower level of starch may be used to obtain functionality similar to the control. In addition, the thermally-inhibited starch was considerably less cohesive than the waxy maize control.

Part B

Vegetable Soup

A retorted chicken vegetable soup containing the above "fill viscosity starch" is prepared using the ingredients shown below.

| Ingredient | % |
| --- | --- |
| Hydroxypropylated T-I Waxy Maize (pH 9.5; 160° C./0 min) | 3.00 |
| Chicken Broth Powder | 6.50 |
| Blanched Vegetable Mixture[1] | 25.00 |
| Water | 65.50 |
| Total | 100.00 |

[1]An equal mixture (by weight) of peas, carrots, celery, and potatoes is blanched at 100° C. (212° F.) for 5 xninutes prior to use.

The starch and chicken powder are blended together and added, along with the vegetables, to the water. The mixture is heated to 85° C. (185° F.) in a steam-jacketed kettle and held for 10 minutes prior to introducing the soup into #1 (10 oz.) cans. The cans are then steam retorted to an internal can temperature of 120° C. (250° F.) and held for 30 minutes prior to cooling. The resultant canned soup should have an equal distribution of particulates within each can and should have a non-cohesive, broth-like texture when diluted 50% with water and heated on a stove.

Example 31

This example illustrates the use of thermally-inhibited starches as "heat penetration" starches for thermally processed (e.g., retorted or UHT-processed) products. "Heat penetration" starch is an art-recognized term which refers to a starch which allows for faster heat transfer during thermal processing.

Part A

Chemically Crosslinked, Thermally-Inhibited Waxy Maize

The starch used was chemically crosslinked with 0.02% phosphorous oxychloride ($POCl_3$) prior to the pH adjustment and thermal dehydration and heat treatment in a fluidized bed (pH 9.5; 160° C./120 min).

Figure 2:
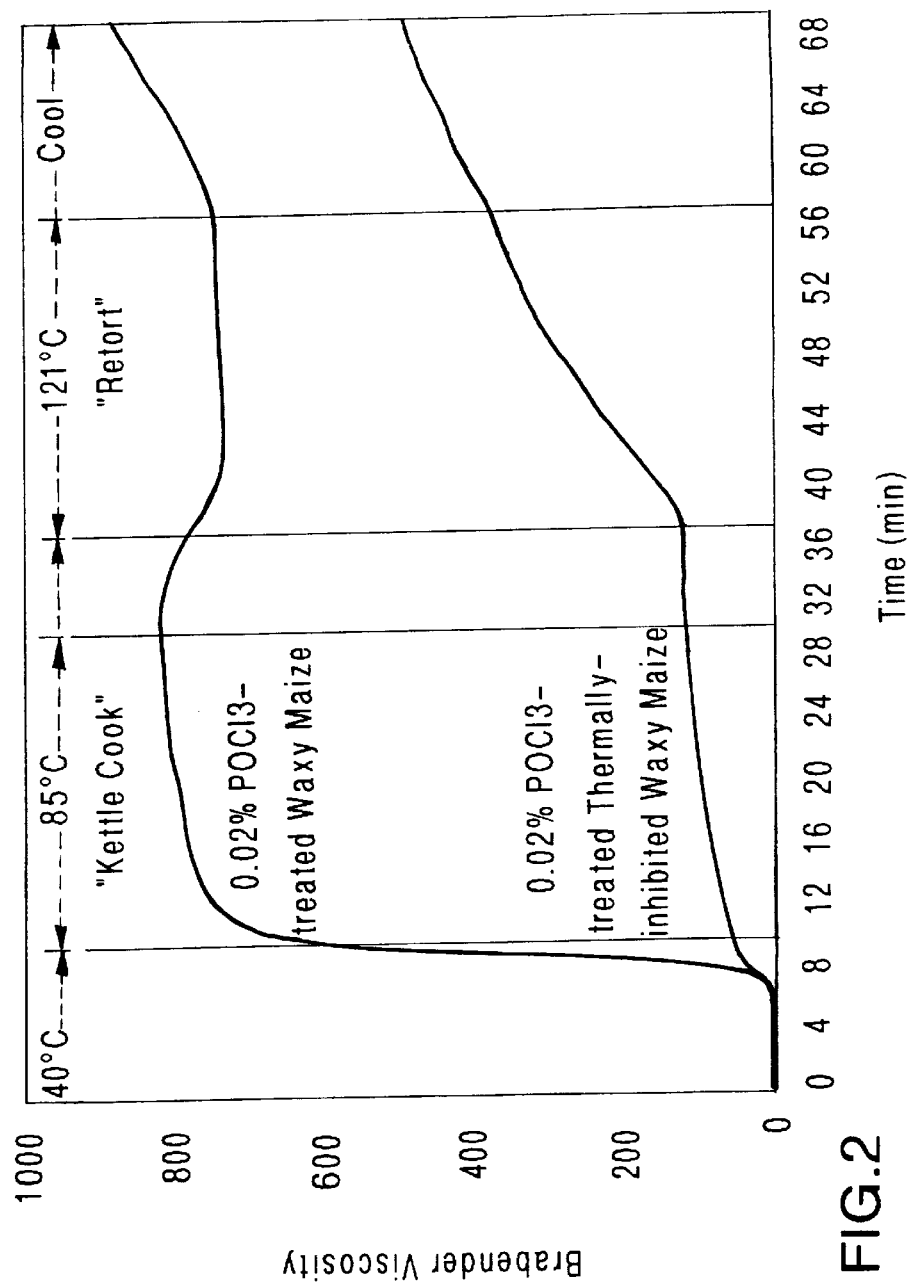
FIG. 2 is a viscosity profile of thermally-inhibited 0.02% $POCL_3$-treated waxy maize at neutral pH and 5% solids.

Using a pressurized VISCO/Amylo/GRAPH (C. W. Brabender) to simulate a canning process where the product is first "kettle-cooked" and then "retorted", a suspension (5% solids; neutral pH of 6.5) of the 20 crosslinked, thermally-inhibited waxy maize starch (pH 9.5; 160° C./120 min) was cooked under the same conditions described in Example 21. The control starch was a waxy maize starch crosslinked with 0.02% phosphorous oxychloride but not thermally-inhibited. The viscosity profiles of these starches are shown in FIG. 2.

The cross-linked, thermally-inhibited waxy maize starch provided little viscosity at about 85° C. (185° F.), but showed a substantial increase in viscosity at the "retort temperature" of about 121° C. compared to the control as shown in FIG. 2. This low viscosity during the kettle cooking phase of the canning operation allows for heat penetration during retorting. Moreover, the starch showed excellent resistance to viscosity breakdown under severe thermal processing conditions. Compared to the control, the "thin-thick" property of the cross-linked, thermally-inhibited starch should allow for quicker heat penetration during retorting, i.e., the time required to reach a specific center can temperature is reduced, thus allowing for faster thermal processing.

Part B

Thermally-Inhibited Starches

The following thermally-inhibited starches and flours have viscosity profiles which would make them useful as "heat penetration" starches.

The Brabender Procedure used here is the same as that previously described for granular non-pregelatinized starches.

| Starch/Flour | pH | Dehydration Method | Heat Treatment | Peak | Viscosity (BU) At 92° C. | At 92° C. +10' | At 92° C. +20' |
|---|---|---|---|---|---|---|---|
| T-I Waxy Maize | 9.5 | Ethanol Extraction | 7 hrs. at 160° C. | None | 160 | 310 | 380 |
| T-I Corn | 9.5 | Oven | 7 hrs. at 160° C. | None | 30 | 75 | 130 |
| T-I Tapioca | 9.5 | Oven | 7 hrs. at 160° C. | None | 50 | 135 | 190 |

Part C

Cream Soup

A retorted cream soup containing any of the "heat penetration" starches is prepared using the ingredients shown below.

| Ingredient | % |
|---|---|
| T-I Starch or Flour | 4.00 |
| Butter Buds 32X[2] (Cumberland Packing Corporation, Racine, WI.) | 2.00 |
| Flour | 0.50 |
| Salt | 0.46 |
| Sweet Whey | 0.20 |
| Celery Salt | 0.05 |
| White Pepper | 0.03 |
| Onion Pepper | 0.01 |
| Whole Milk | 68.70 |
| Light Cream | 24.05 |
| Total | 100.00 |

The dry ingredients are preblended and added to the milk and cream mixture under agitation in a steam-jacketed kettle. The mix is heated to approximately 85° C. (185° F.) and held for 10 minutes. The soup is then filled into #1 (10 oz.) cans and steam-retorted at 121° C. (250° F.) for 20 minutes.

The soup prior to retorting should be low in viscosity and easy to handle during the can filling operation. Efficient heat penetration during retorting should allow the starch or flour to cook out, thus producing a soup which has a creamy texture and is higher in viscosity than the soup prior to retorting. When using the above starches or flours in this, or similar applications, an increase in the final viscosity should be achieved along with a reduction in the thermal processing time, i.e., the time it takes to reach "commercial sterility."

Example 32

This example shows the use of thermally-inhibited (thermally dehydrated and heat treated) waxy maize starch and a thermally-inhibited waxy rice flour in a 25% fat salad dressing. The thermally-inhibited starch and flour were prepared in a dextrinizer.

The ingredients are shown below.

| Ingredient | % | % |
|---|---|---|
| Water | 42.58 | 42.58 |
| Sunflower Oil | 25.00 | 25.00 |
| Fresh Whole Eggs | 8.50 | 8.50 |
| Sugar | 7.50 | 7.50 |
| T-I Waxy Maize (pH 9.5; 160° C./90 min) | 4.50 | — |
| T-I Waxy Rice Flour (pH 9.5; 150° C./15 min) | — | 4.50 |
| Wine vinegar | 3.50 | 3.50 |
| Tarragon vinegar | 3.50 | 3.50 |
| Mustard | 2.20 | 2.20 |
| Salt | 2.00 | 2.00 |
| Lemon vinegar | 0.50 | 0.50 |
| Citric Acid | 0.20 | 0.20 |
| Potassium sorbate | 0.02 | 0.02 |
| Total | 100.00 | 100.00 |

The salad dressing was prepared by blending the dry ingredients, preparing a potassium sorbate solution, adding the dry mixture to an aqueous phase containing the potassium sorbate solution and other aqueous liquids, heating to 85° C. (185° F.) for 5 minutes, cooling to 30° C. (86° F.), adding an egg and oil mixture under vacuum, homogenizing the two mixtures, and filling into glass containers. Under relatively severe processing conditions (i.e., high shear), as well as high acid (pH about 3.3) and fat content, both the thermally-inhibited waxy maize starch and waxy rice flour gave excellent texture, creaminess, and homogeneity. In addition, the taste of the experimental products was comparable to that of the control. The results of a storage stability test revealed a relatively stable product through 12 weeks of refrigerated storage. See table below for stability test results expressed as a function of viscosity in cps (Brookfield RVT Viscometer, #4 spindle, 10 rpm).

Storage Stability Of Salad Dressings
Using Heat Treated Starch Or Flour

| Weeks Of Refrigerated Storage | Viscosity Of Salad Dressing Containing T-I Waxy Maize Starch (cps) | Viscosity Of Salad Dressing Containing T-I Waxy Rice Flour (cps) |
| --- | --- | --- |
| 0 | 13,500 | 10,250 |
| 1 | 12,250 | 8,500 |
| 2 | 11,750 | 8,250 |
| 3 | 11,500 | 9,000 |
| 4 | 11,500 | 9,250 |
| 6 | 11,500 | 8,500 |
| 8 | 10,800 | 7,600 |
| 10 | 12,600 | 7,600 |
| 12 | 10,600 | 7,800 |

Example 33

This example illustrates the preparation of another high acid food product containing a pregelatinized, granular thermally-inhibited starch. The starch is pregelatinized as described earlier.

A lemon pie filling is prepared using the ingredients shown below:

| | |
| --- | --- |
| Pregelatinized granular T-I Tapioca (pH 10; 160° C./15 min) | 7.31% |
| Lemon Crystals #7 | 0.98% |
| Water | 69.70% |
| Sugar | 20.82% |
| Egg Yolk Solids | 1.07% |
| F.D. & C. Yellow #5 | 0.12% |
| Total | 100.00% |

All dry ingredients are first blended thoroughly. The water is placed in the mixing bowl of a Mixmaster mixer, and the dry mix is added to the liquid while mixing at a low speed (#2) until smooth. The filling thus obtained is placed in a baked pie crust and refrigerated for a minimum of one hour. The resulting pie filling should have a short, tender gel which cuts easily. The flavor, as well as the texture and mouth-feel, of the filling should be good.

Example 34

This example illustrates the preparation of instant imitation grape jellies employing pregelatinized granular starches which are prepared as previously described and subsequently thermally-inhibited.

The ingredients are shown below:

| | | |
| --- | --- | --- |
| Pregelatinized granular T-I Corn (pH 8.5; 150° C./0 min) | 5.95% | — |
| Pregelatinized granular T-I Potato (pH 9.5; 150° C./0 min) | — | 5.95% |
| Sugar | 29.00% | 29.00% |
| Sodium Benzoate | 0.09% | 0.09% |
| Unsweetened Concord Grape Juice | 45.00% | 45.00% |
| Water | 19.96% | 19.96% |
| Total | 100.00% | 100.00% |

The solid ingredients are blended together and added to the liquids in the mixing bowl of a Sunbeam Mixmaster mixer and mixed on low speed for 2–3 minutes The resulting mixture is refrigerated for a minimum of 4 hours.

The resultant jellies should have a clean-cutting jelly texture.

Example 35

This example describes the preparation of a no-fat French salad dressing. The starch is pregelatinized using the procedure previously described.

The ingredients are shown below:

| Ingredient | % |
| --- | --- |
| Water | 48.14 |
| Sugar | 11.51 |
| Tomato paste (25% solids) | 6.5 |
| Salt | 1.0 |
| Mustard Powder | 0.3 |
| Onion Powder | 0.3 |
| Garlic Powder | 0.2 |
| Keltrol F (gum) | 0.35 |
| Keloid LVF (gum) | 0.3 |
| MSG | 0.5 |
| Oleoresin Paprika | 0.12 |
| Sodium Benzoate | 0.08 |
| Waxy Maize | 2.5 |
| 50 Grain white vinegar | 24.0 |
| TiO$_2$ | 0.15 |
| Potassium sorbate | 0.08 |
| Pregelatinized T-I Waxy Maize (pH 9.5; 160° C./0 min) | 4.08 |
| Total | 100.00 |

The French salad dressing is prepared by blending the dry ingredients, adding the blend to water in a Hobart Mixer, and mixing the aqueous dispersion for 10 minutes at #2 speed. The tomato paste, oleoresin, and paprika are blended, added to the aqueous dispersion, and mixed for 2 minutes at #2 speed. The oil is slowly added at #2 speed, followed by the vinegar. The mixture is mixed for one minute at #3 speed and then put through a Charlotte colloid mill set at a clearance of 0.03 inches. The resultant dressing should have a smooth and creamy texture.

Example 36

This example describes the preparation of a flavored particle for inclusion in a muffin mix which is prepared using a thermally-inhibited pregelatinized corn starch which is pregelatinized using the procedure previously described.

The following dry ingredients are mixed to a homogeneous blend in a ribbon blender:

Sweet whey: 17.2 parts

Dextrose (as corn syrup solids): 14.9 parts

Sucrose (95%): 7.4 parts

Wheat flour: 31.2 parts

Pregelatinized T-I Corn Starch 6.5: parts (pH 9.0; 160° C./15 min)

The following ingredients are mixed to a homogeneous dispersion of solids and liquids:

Liquid corn oil: 13.7 parts

Glycerine: 7.7 parts

USDA blue color: 1.1 parts

Imitation blueberry flavor: 0.2 part

Citric acid: 0.1 part

The dispersion is slowly added to the dry ingredients in the ribbon blender and mixing at room temperature is continued until a homogeneous semi-solid dispersion is obtained. Sufficient water is added during mixing to provide a moisture content of 15%.

The semi-solid dispersion is passed through a California Pellet mill and cut into particles of approximately cylindrical shape having a diameter of about ⅛ inch and a length of about ¼ inch. The particles are semi-soft in the nature of berry pulp. They can be stored at room temperature for at least 1 year without significant deterioration of the semi-soft and semi-moist texture or loss of flavor.

Example 37

This example describes the use of an acid converted, octenyl succinic acid (OSA) derivatized, thermally-inhibited waxy maize starch in the preparation of a low fat non-dairy creamer. The ingredients used are set out below:

| Ingredient | % |
|---|---|
| Water | 50.0 |
| Corn Syrup Solids (240) | 37.5 |
| Vegetable Fat (melting point: 45° C.) | 10.0 |
| Converted, OSA derivatized, T-I waxy maize (pH 9.5; 160° C./30 min) | 2.5 |
| Total | 100.0 |

The starch is cooked in water at 95° C. (203° F.) for 15 minutes. While keeping the temperature above 75° C./(167° F.), the syrup and melted fat are added with mixing. The mixture is homogenized while hot at 3000 psi. The resulting emulsion is spray-dried while maintaining the temperature at 60° C. (140° F.) or above.

Now that the preferred embodiments of the present invention have been described in detail, various modifications and improvements thereto will become readily apparent to those skilled in the art. Accordingly, the spirit and scope of the invention are to be limited only by the appended claims and foregoing specification.

What is claimed is:

1. A food composition which comprises a food in combination with a thermally-inhibited, ungelatinized granular starch or flour which is prepared by dehydrating an ungelatinized granular starch or flour to anhydrous or substantially anhydrous and subsequently heat treating the anhydrous or substantially anhydrous starch or flour for a time and at a temperature sufficient to inhibit the starch or flour.

2. The food of claim 1, wherein the starch or flour is adjusted to a pH of neutral or greater prior to the dehydrating.

3. The food composition of claim 2, wherein the starch or flour is thermally dehydrated.

4. The food composition of claim 3, wherein the starch or flour is non-thermally dehydrated by solvent extraction or by freeze drying.

5. The food composition of claim 2, wherein the thermally-inhibited starch or flour is is washed with water after the heat treating.

6. The food composition of claim 2, wherein protein and/or lipid is removed from the starch or flour prior to or after the dehydrating and heat treating to improve the flavor of the thermally-inhibited starch or flour.

7. The food composition of claim 2, wherein the thermally-inhibited starch is a waxy starch selected from the group consisting of waxy maize, V.O. hybrid waxy maize, waxy rice, waxy barley, and waxy potato.

8. The food composition of claim 2, wherein the food is a thermally processed acidic food; a dry mix for preparing cooked foods or for dusting foods to be battered and cooked; a refrigerated or frozen food; an extruded food; a stove top-cooked food; an oven-prepared food; a microwaveable food; a low-fat or no-fat food; or a food having a low water activity.

9. The food composition of claim 8, wherein the food is a refrigerated food or a frozen food and wherein the starch is a freeze-thaw stable, thermally-inhibited starch selected from the group consisting of waxy maize, V.O. waxy maize, waxy rice, waxy barley, and amaranth, or a thermally-inhibited waxy rice flour, or a thermally-inhibited derivatized starch.

10. The food composition of claim 2, wherein the food is a yogurt; a sour cream; a cheese cake; a sauce selected from the group consisting of a white sauce, a cheese sauce, a barbecue sauce, and a tomato sauce; a fried food; an emulsified meat; an ice cream; a frozen dinner; a baby food; a pie filling; a gravy; a baked product; a cereal; a snack; or a pasta.

11. The food composition of claim 2 wherein the pH is about 7 to about 10; wherein the heating temperature is greater than about 100° C.; and wherein the heating time is up to 20 hours.

12. The food composition of claim 2 wherein the pH is above 8 to below 10; wherein the heating temperature is about 120 to about 180° C.

13. The food composition of claim 2 wherein the dehydrating and heat treating steps are carried out simultaneously in a fluidized bed at a temperature of about 140 to about 160° C.

14. A method for preparing a food composition which is to be thickened or gelled by heating, which comprises the step of adding to one or more food ingredients, prior to heating the food ingredients, a thermally-inhibited, ungelatinized granular starch or flour.

15. A method for preparing a food composition which is to be extended, thickened, or gelled without heating, which comprises the step of adding to one or more food ingredients, a thermally-inhibited granular starch which is prepared by dehydrating a pregelatinized granular starch or flour to anhydrous or substantially anhydrous and subsequently heat heating the anhydrous or substantially anhydrous starch for a time and at a temperature sufficient to inhibit the starch or which is prepared by dehydrating an ungelatinized granular starch to anhydrous or substantially anhydrous, heat treating the anhydrous or substantially anhydrous starch for a time and at a temperature sufficient to inhibit the starch, and pregelatinizing the inhibited starch.

16. A method for preparing a liquid-containing food composition which is initially kettle-cooked, added to a container, and retorted or ultra high temperature processed, which method comprises the step of adding to the food, prior to or during the initial kettle cooking, an effective amount of a heat penetration starch which is a thermally-inhibited, chemically crosslinked ungelatinized starch which develops little or no viscosity during the kettle cooking, but which increases in viscosity during the retorting or ultra high temperature processing.

17. A method for preparing a liquid-containing food composition which is initially kettle-cooked, added to a container, and retorted or ultra high temperature processed, prior to or during the initial kettle cooking, an effective amount of a heat penetration starch which is a thermally-inhibited, ungelatinized granular starch which develops little or no viscosity during the kettle cooking, but which increases in viscosity during the retorting or ultra high temperature processing.

18. A method for preparing a thermally processed food composition which contains a liquid and particulates and which is initially kettle-cooked, added to a container, and subsequently retorted or ultra high temperature processed, which method comprises the step of adding to the food, prior to or during the initial kettle-cooking, an effective amount of a fill viscosity starch which is a thermally-inhibited, derivatized starch which develops sufficient viscosity during the kettle cooking to uniformly suspend the particulates in the liquid during the addition of the food to the container but which, during the subsequent retorting or ultra high temperature processing, drops in viscosity.

19. A food composition which comprises a food in combination with a thermally-inhibited, pregelatinized granular starch or flour which is prepared by pregelatinizing a granular starch or flour, dehydrating the pregelatinized granular starch or flour to anhydrous or substantially anhydrous, and heat treating the anhydrous or substantially anhydrous pregelatinized starch or flour for a time and at a temperature sufficient to inhibit the pregelatinized starch or flour.

20. A food composition which comprises a food in combination with a thermally-inhibited, pregelatinized granular starch or flour which is prepared by dehydrating an ungelatinized granular starch or flour to anhydrous or substantially anhydrous, heat treating the anhydrous or substantially anhydrous starch or flour for a time and at a temperature sufficient to inhibit the ungelatinized starch or flour, and pregelatinizing the inhibited ungelatinized starch or flour.

21. The food composition of claims 19 or 20, wherein the starch or flour is thermally dehydrated.

22. The food composition of claims 19 or 20, wherein the starch or flour is non-thermally dehydrated by solvent extraction or by freeze drying.

23. The food composition of claim 22, wherein the starch or flour is non-thermally dehydrated by solvent extraction or by freeze drying.

24. The food composition of claims 19 or 20, wherein protein and/or lipid is removed from the starch or flour prior to or after the pregelatinizing, dehydrating, and heat treating to improve the flavor of the thermally-inhibited starch or flour.

25. The food composition of claims 19 or 20, wherein the thermally-inhibited starch is a waxy starch.

26. The food compositions of claims 19 or 20, wherein the starch is selected from the group consisting of corn, pea, potato, sweet potato, barley, wheat, rice, sago, banana, amaranth, tapioca, sorghum, V.O. hybrid waxy maize, waxy maize, waxy rice, waxy barley, waxy potato, a starch containing greater than 40% amylose, and combinations thereof.

* * * * *

(12) EX PARTE REEXAMINATION CERTIFICATE (9572nd)
United States Patent
Thomas et al.

(10) Number: US 6,221,420 C1
(45) Certificate Issued: Mar. 26, 2013

(54) FOODS CONTAINING THERMALLY-INHIBITED STARCHES AND FLOURS

(75) Inventors: David J. Thomas, Woodbury, MN (US); Chung-Wai Chiu, Westfield, NJ (US); Eleanor Schiermeyer, Bound Brook, NJ (US); Manish B. Shah, Franklin Park, NJ (US); Douglas H. Hanchett, Wharton, NJ (US); Roger Jeffcoat, Bridgewater, NJ (US)

(73) Assignee: Corn Products Development, Inc., Westchester, IL (US)

Reexamination Request:
No. 90/011,968, Oct. 19, 2011

Reexamination Certificate for:
Patent No.: 6,221,420
Issued: Apr. 24, 2001
Appl. No.: 08/619,569
Filed: May 29, 1996

(21) Appl. No.: 90/011,968

(22) PCT Filed: Jul. 28, 1995

(86) PCT No.: PCT/US95/09138
§ 371 (c)(1), (2), (4) Date: May 29, 1996

(87) PCT Pub. No.: WO96/03892
PCT Pub. Date: Feb. 15, 1996

Related U.S. Application Data

(63) Continuation-in-part of application No. PCT/US95/00684, filed on Jan. 18, 1995, and a continuation-in-part of application No. 08/473,688, filed on Jun. 7, 1995, now abandoned, and a continuation-in-part of application No. 08/476,963, filed on Jun. 7, 1995, now Pat. No. 5,720,822, said application No. PCT/US95/00684 is a continuation-in-part of application No. PCT/US94/08559, filed on Jul. 29, 1994, and a continuation-in-part of application No. 08/296,211, filed on Aug. 25, 1994, now abandoned, said application No. PCT/US94/08559 is a continuation-in-part of application No. 08/099,753, filed on Jul. 30, 1993, now abandoned, said application No. 08/296,211 is a continuation-in-part of application No. 08/099,753.

(51) Int. Cl.
| | |
|---|---|
| A21D 2/18 | (2006.01) |
| A21D 6/00 | (2006.01) |
| A23C 9/137 | (2006.01) |
| A23C 19/00 | (2006.01) |
| A23C 19/076 | (2006.01) |
| A23G 3/32 | (2006.01) |
| A23G 9/34 | (2006.01) |
| A23G 9/52 | (2006.01) |
| A23L 1/00 | (2006.01) |
| A23L 1/0522 | (2006.01) |
| A23L 1/068 | (2006.01) |
| A23L 1/05 | (2006.01) |
| A23L 1/06 | (2006.01) |
| A23L 1/10 | (2006.01) |
| A23L 1/16 | (2006.01) |
| A23L 1/18 | (2006.01) |
| A23L 1/187 | (2006.01) |
| A23L 1/19 | (2006.01) |
| A23L 1/212 | (2006.01) |
| A23L 1/214 | (2006.01) |
| A23L 1/217 | (2006.01) |
| A23L 1/24 | (2006.01) |
| A23L 1/39 | (2006.01) |
| C08B 30/12 | (2006.01) |

(52) U.S. Cl.
USPC ............ 426/578; 426/573; 426/658; 426/661

(58) Field of Classification Search .................. None
See application file for complete search history.

(56) References Cited

To view the complete listing of prior art documents cited during the proceeding for Reexamination Control Number 90/011,968, please refer to the USPTO's public Patent Application Information Retrieval (PAIR) system under the Display References tab.

*Primary Examiner* — Gary Kunz

(57) ABSTRACT

A thermally-inhibited granular starch or flour is used as an ingredient in various foods. The thermally-inhibited starches are functionally equivalent to chemically cross-linked starches. The stashes or flours are prepared by dehydrating the starch or flour to anhydrous or substantially anhydrous (<1% moisture), preferably at a neutral or basic pH, and heat treating the dehydrated starch or flour for a time sufficient to inhibit the starch to the desired degree. The dehydration may be carried out by heating the starch, extracting the starch with a solvent, or freeze drying the starch. The starch may be pregelatinized prior to or after thermal inhibition using known methods which do not substantially rupture the starch granules.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 16, 18-22 and 24-26 is confirmed.

Claim 23 is cancelled.

Claims 1, 4, 5, 11, 14, 15 and 17 are determined to be patentable as amended.

Claims 2, 3, 6-10, 12 and 13, dependent on an amended claim, are determined to be patentable.

1. A food composition which comprises a food in combination with a thermally-inhibited, ungelatinized granular starch or flour which is prepared by dehydrating an ungelatinized granular starch or flour to anhydrous or substantially anhydrous and subsequently heat treating the anhydrous or substantially anhydrous starch or flour for a time and at a temperature sufficient to inhibit the starch or [flour] *flour, wherein substantially anhydrous or anhydrous is less than 1 wt% moisture*.

4. The food composition of [claim 3] *claim 2*, wherein the starch or flour is non-thermally dehydrated by solvent extraction or by freeze drying.

5. The food composition of claim 2, wherein the thermally-inhibited starch or flour is [is] washed with water after the heat treating.

11. The food composition of claim 2 wherein the pH is about 7 to about 10;
wherein the heating temperature is greater than about [100° C.] *100° C.*; and wherein the heating time is up to 20 hours.

14. A method for preparing a food composition which is to be thickened or gelled by heating, which comprises the step of adding to one or more food ingredients, prior to heating the food ingredients, a thermally-inhibited, ungelatinized granular starch or flour *which is prepared by dehydrating an ungelatinized granular starch to anhydrous or substantially anhydrous, and heat treating the anhydrous or substantially anhydrous starch for a time and at a temperature sufficient to inhibit the starch, wherein substantially anhydrous or anhydrous is less than 1 wt% moisture*.

15. A method for preparing a food composition which is to be extended, thickened, or gelled without heating, which comprises the step of adding to one or more food ingredients, a thermally-inhibited granular starch which is prepared by dehydrating a pregelatinized granular starch or flour to anhydrous or substantially anhydrous and subsequently heat [heating] *treating* the anhydrous or substantially anhydrous starch for a time and at a temperature sufficient to inhibit the starch or which is prepared by dehydrating an ungelatinized granular starch to anhydrous or substantially anhydrous, heat treating the anhydrous or substantially anhydrous starch for a time and at a temperature sufficient to inhibit the starch, and pregelatinizing the inhibited flour.

17. A method for preparing a liquid-containing food composition which is initially kettle-cooked, added to a container, and retorted or ultra high temperature processed,*which method comprises the step of adding to the food,* prior to or during the initial kettle cooking, an effective amount of a heat penetration starch which is a thermally-inhibited, ungelatinized granular starch which develops little or no viscosity during the kettle cooking, but which increases in viscosity during the retorting or ultra high temperature processing.

* * * * *